(12) United States Patent
Hirai et al.

(10) Patent No.: US 10,884,612 B2
(45) Date of Patent: Jan. 5, 2021

(54) INPUT DISPLAY CONTROL DEVICE, INPUT DISPLAY CONTROL METHOD, AND INPUT DISPLAY SYSTEM

(71) Applicant: MITSUBISHI ELECTRIC CORPORATION, Tokyo (JP)

(72) Inventors: Masato Hirai, Tokyo (JP); Akiko Imaishi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 82 days.

(21) Appl. No.: 16/068,459

(22) PCT Filed: Feb. 8, 2016

(86) PCT No.: PCT/JP2016/053686
§ 371 (c)(1),
(2) Date: Jul. 6, 2018

(87) PCT Pub. No.: WO2017/138076
PCT Pub. Date: Aug. 17, 2017

(65) Prior Publication Data
US 2019/0012075 A1 Jan. 10, 2019

(51) Int. Cl.
G06F 3/0488 (2013.01)
G06F 3/0484 (2013.01)
(Continued)

(52) U.S. Cl.
CPC ...... G06F 3/04883 (2013.01); G06F 3/04845 (2013.01); G06F 3/147 (2013.01);
(Continued)

(58) Field of Classification Search
CPC ........ G06F 3/04883; G06F 3/16; G06F 3/167; G06T 11/203; G09G 2340/14
See application file for complete search history.

(56) References Cited

U.S. PATENT DOCUMENTS 8,584,012 B1 * 11/2013 Orshanskiy .......... G06T 11/203
715/256
2012/0017159 A1 1/2012 Roh et al.
(Continued)

FOREIGN PATENT DOCUMENTS

JP 10-124033 A 5/1998
KR 10-2012-0009546 A 2/2012
(Continued)

OTHER PUBLICATIONS

SAP Blogs, "Expand the width of the Interactive text field dynamically based the text entered in SAP Adobe Interactive forms", Jul. 19, 2013 available at https://blogs.sap.com/2013/07/19/expand-the-width-of-the-interactive-text-field-dynamically-based-the-text-entered-in-sap-adobe-interactive-forms.*
(Continued)

Primary Examiner — Matthew Ell
(74) Attorney, Agent, or Firm — Birch, Stewart, Kolasch & Birch, LLP

(57) ABSTRACT

A display control unit determines, in a case of determining that a part of a character string acquired by a character string acquiring unit cannot be displayed along a curve indicated by curve information acquired by a curve information acquiring unit because the length of the curve is short, a shape of an extended part of the curve from a shape of the curve indicated by the curve information acquired by the curve information acquiring unit, extends the curve, and generates display information for displaying the part of the character string along the curve of the extended part.

8 Claims, 26 Drawing Sheets

(51) Int. Cl.
  *G06T 11/20* (2006.01)
  *G06F 3/16* (2006.01)
  *G09G 5/32* (2006.01)
  *G09G 5/00* (2006.01)
  *G06F 3/147* (2006.01)
  *G06F 40/109* (2020.01)

(52) U.S. Cl.
  CPC ............... *G06F 3/16* (2013.01); *G06F 3/167* (2013.01); *G06F 40/109* (2020.01); *G06T 11/203* (2013.01); *G09G 5/00* (2013.01); *G09G 5/32* (2013.01); *G06T 2200/24* (2013.01); *G09G 2340/045* (2013.01); *G09G 2340/12* (2013.01); *G09G 2340/14* (2013.01)

(56) References Cited

U.S. PATENT DOCUMENTS

2012/0086663 A1* 4/2012 Matsuo ............. H04M 1/72519
  345/173
2014/0163983 A1* 6/2014 Kim ........................ G10L 15/26
  704/235
2014/0344662 A1* 11/2014 Isabel ................... G06F 17/241
  715/230
2016/0077702 A1 3/2016 Nomachi et al.
2018/0005604 A1 1/2018 Hirai et al.

FOREIGN PATENT DOCUMENTS

KR  10-2014-0074725 A  6/2014
WO  WO 2014/0175395 A1  10/2014
WO  WO 2016/189735 A1  12/2016

OTHER PUBLICATIONS

EHowEducation, "How to Extrapolate Graphs: Graphing in Math", Jan. 28, 2013 available at http://www.youtube.com/watch?v=iPZp-5Eucow.*
Office Action dated Apr. 17, 2020 in corresponding Korean Patent Application No. 10-2019-7013942.

* cited by examiner

FIG. 6

| Character Type | Character Size | Character Height | Character Width |
|---|---|---|---|
| A | 5 | 2.5 mm | 2.5 mm |
|   | 10 | 5 mm | 5 mm |
|   | 15 | 7.5 mm | 7.5 mm |
|   | 20 | 10 mm | 10 mm |
| B | 5 | 2 mm | 1.25 mm |
|   | 10 | 4 mm | 2.5 mm |
|   | 15 | 6 mm | 3.75 mm |
|   | 20 | 8 mm | 5 mm |
| C | ... | ... | ... |
|   | ... | ... | ... |
|   | ... | ... | ... |
|   | ... | ... | ... |

FIG. 8

[Case Where Character String Indicating Recognition Result of Voice Is Output First]

Step A

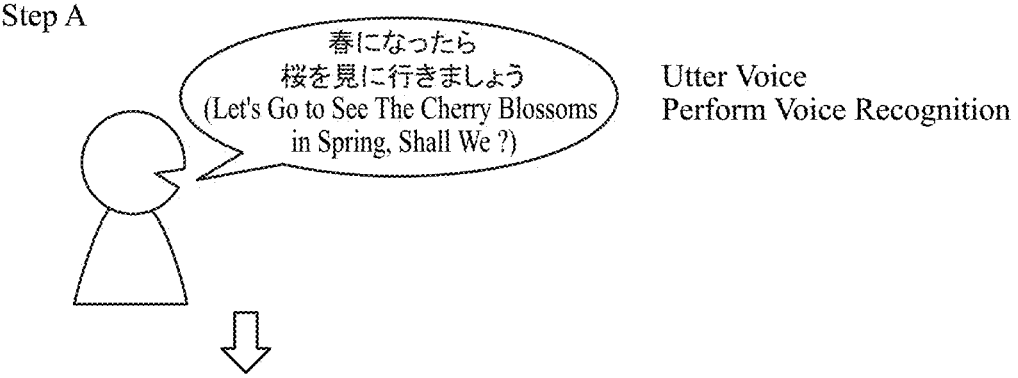

Utter Voice
Perform Voice Recognition

Step B

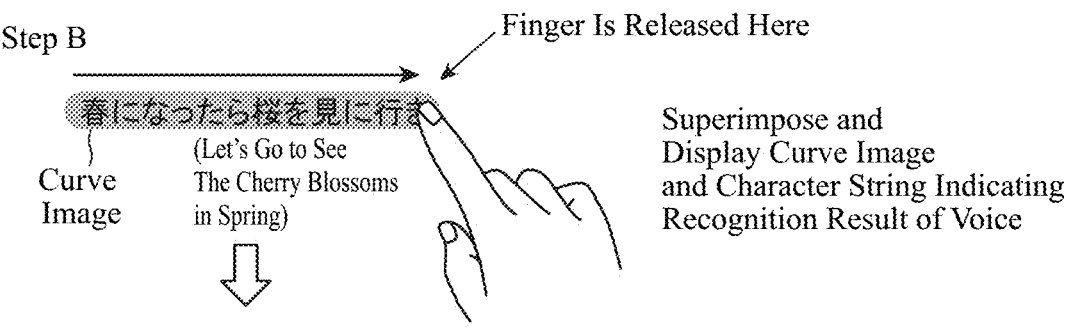

Finger Is Released Here

Superimpose and
Display Curve Image
and Character String Indicating
Recognition Result of Voice Step C

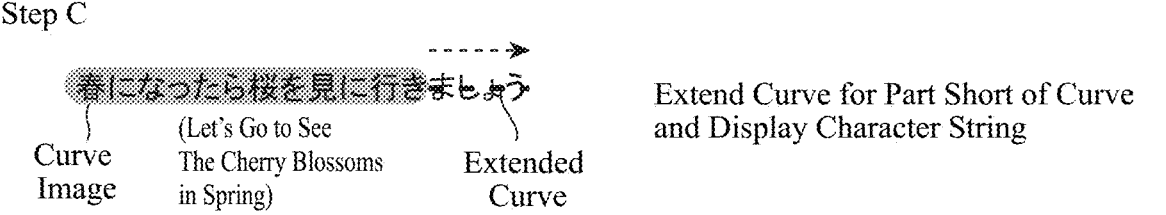

Extend Curve for Part Short of Curve
and Display Character String

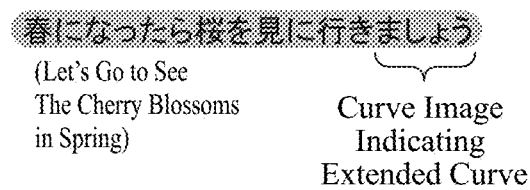

Step E

春になったら桜を見に行きましょう
(Let's Go to See The Cherry Blossoms in Spring)

Delete Curve Image

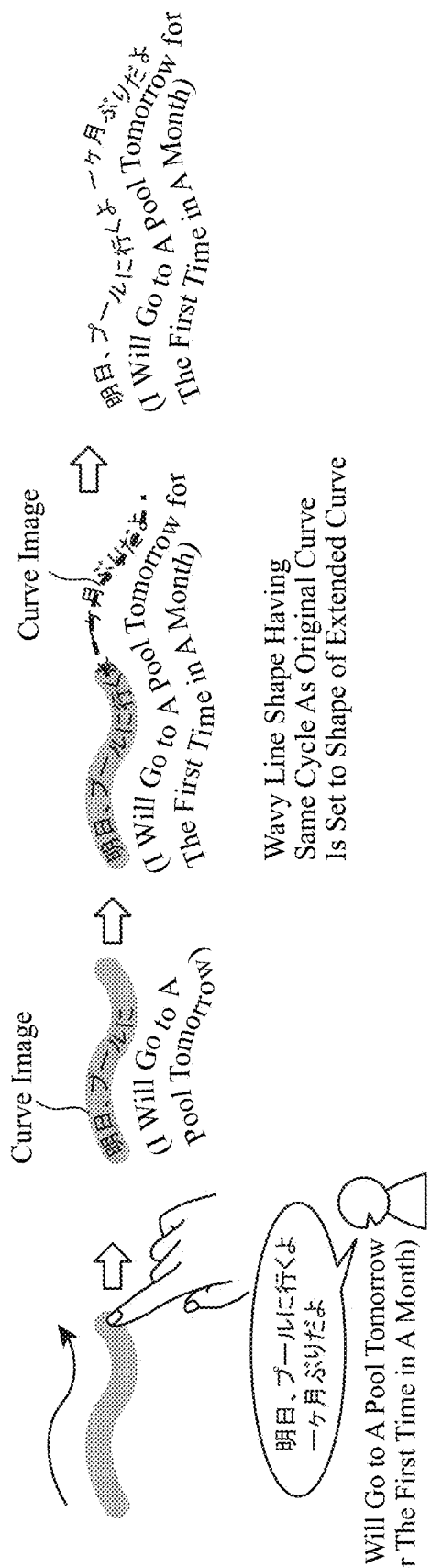
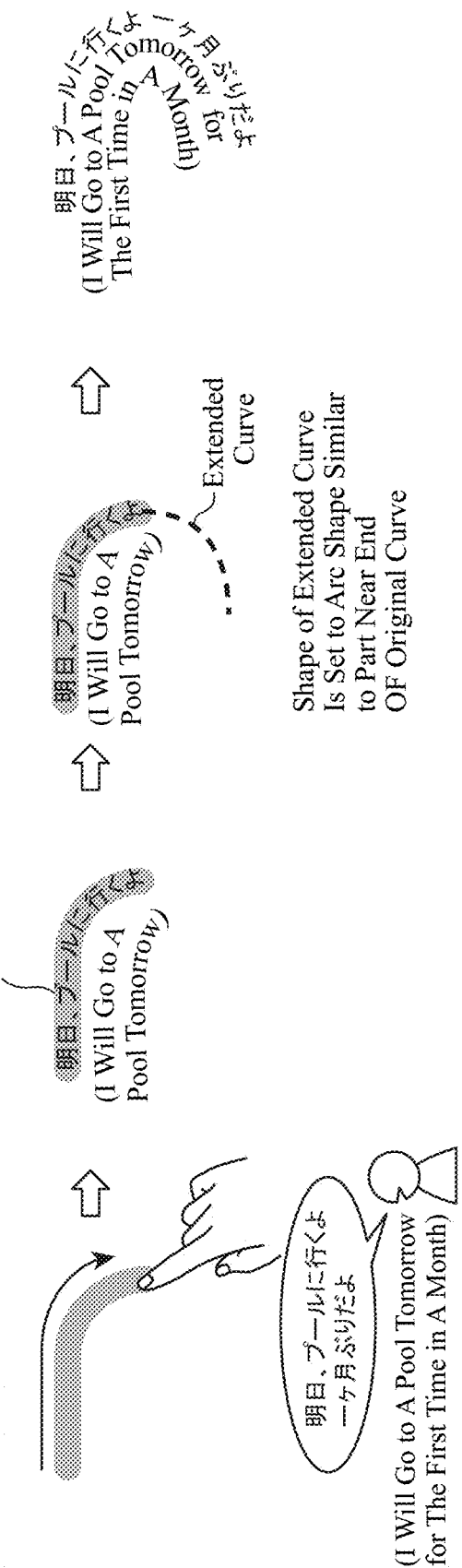

FIG. 16

Step A

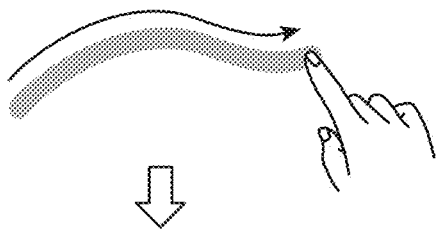

Display Image of Curve Representing Locus of Line Drawn by Operation

Step B

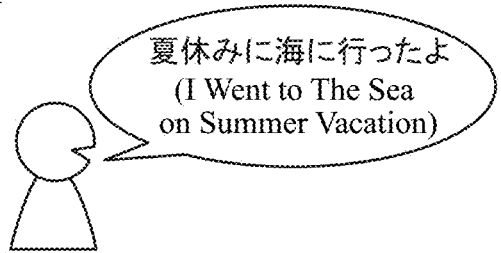

Utter Voice
Perform Voice Recognition

Step C

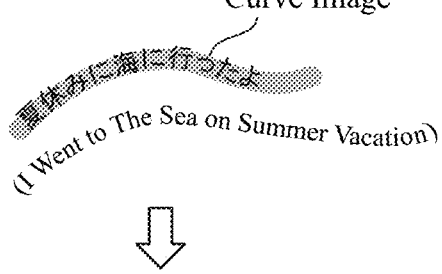

Curve Image

Superimpose and Display Character String Indicating Voice Recognition Result on Curve Image Step D

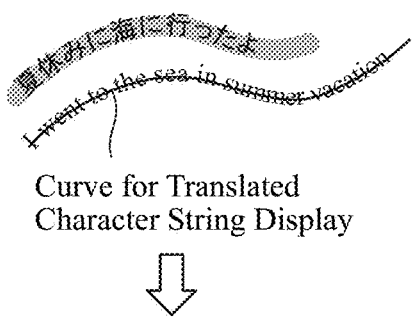

Curve for Translated Character String Display

Curve for Translated Character String Display
Display Character String Indicating Translation Result Along Curve Step E

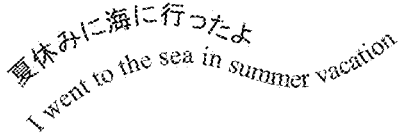

Delete Curve Image

FIG. 17
Step A
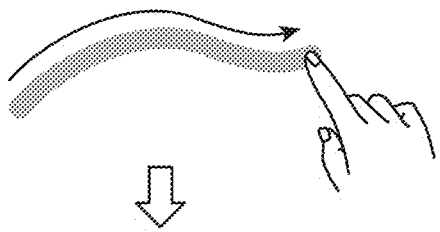
Display Image of Curve Representing Locus of Line Drawn by Operation
Step B
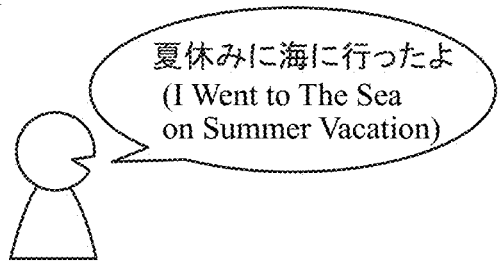
Utter Voice
Perform Voice Recognition
Step C
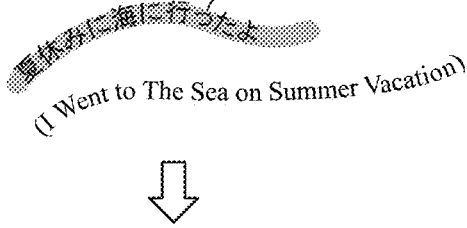
Superimpose and
Display Character String
Indicating Voice Recognition Result
on Curve Image
Step D
Superimpose and
Display Character String
Indicating Translation Result
on Curve Image
Step E
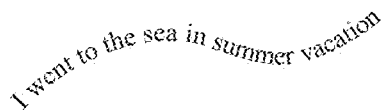
Delete Curve Image

FIG. 18
Step A
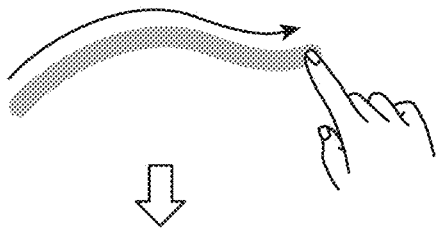
Display Image of Curve Representing Locus of Line Drawn by Operation
Step B
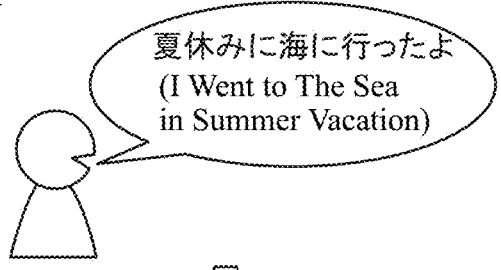
Utter Voice
Perform Voice Recognition
Step C
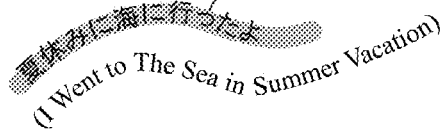
Superimpose and
Display Character String
Indicating Voice Recognition Result
on Curve Image
Step D
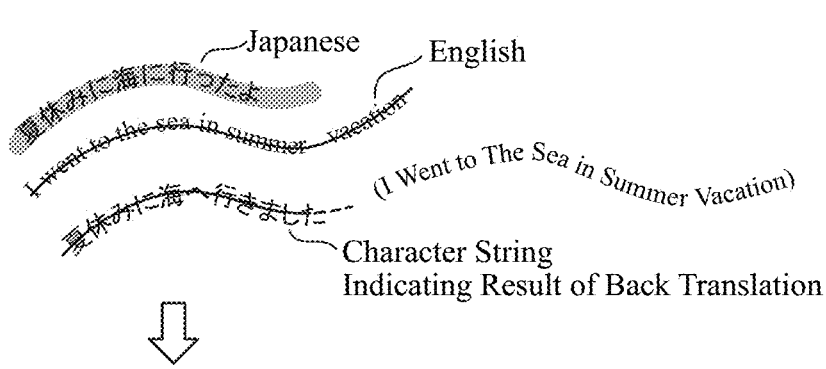
Step E
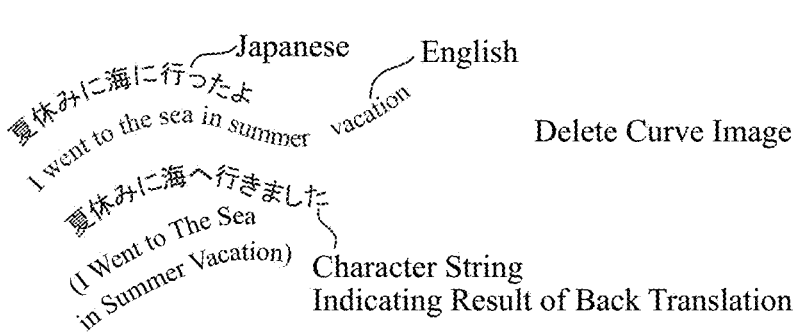
Delete Curve Image

FIG. 19

Step A

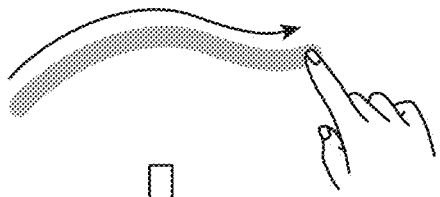

Display Image of Curve Representing Locus of Line Drawn by Operation

Step B

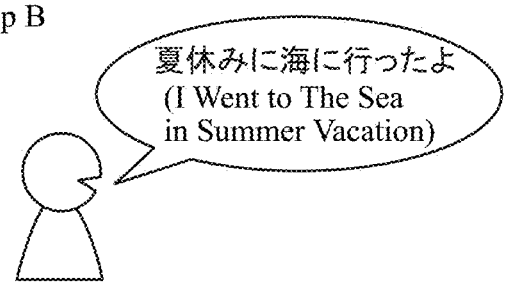

Utter Voice
Perform Voice Recognition

Step C

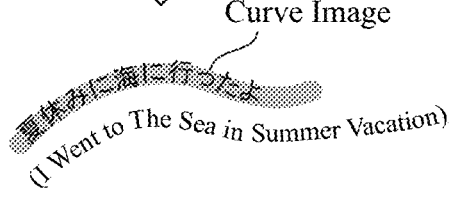

Curve Image

Superimpose and
Display Character String
Indicating Voice Recognition Result
on Curve Image Step D

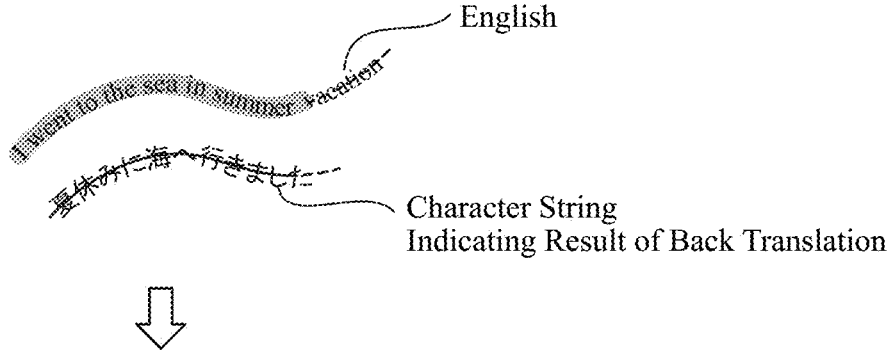

English

Character String
Indicating Result of Back Translation

Step E

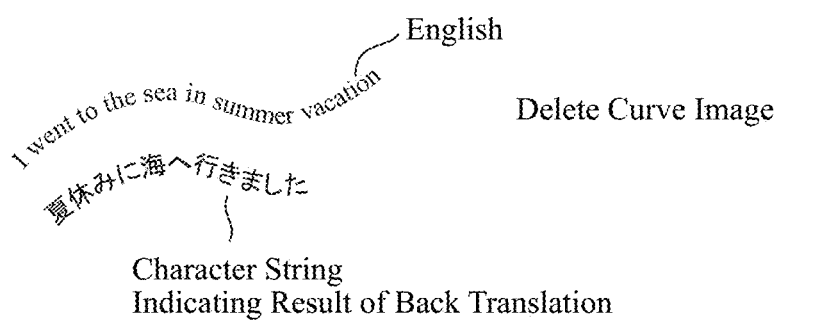

English

Delete Curve Image

Character String
Indicating Result of Back Translation

INPUT DISPLAY CONTROL DEVICE, INPUT DISPLAY CONTROL METHOD, AND INPUT DISPLAY SYSTEM

TECHNICAL FIELD

The present invention relates to an input display control device, an input display control method, and an input display system for generating display information for displaying a character string.

BACKGROUND ART

Patent Literature 1 listed below discloses a display device for displaying a character string along a line such as a curve.

CITATION LIST

Patent Literatures

Patent Literature 1: JP 10-124033 A

SUMMARY OF INVENTION

Technical Problem

Since the conventional display device is configured as described above, the entire character string can be displayed along the curve when the length of the curve is longer than the length of the character string. However, there is a problem in that a part of the character string cannot be displayed along the curve when the length of the curve is shorter than the length of the character string.

The present invention has been made to solve the above problem, and an object is to obtain an input display control device, an input display control method, and an input display system capable of displaying an entire character string along a curve even when the length of the acquired curve is shorter than the length of the character string.

Solution to Problem

An input display control device according to the present invention includes a processor; and a memory storing instructions which, when executed by the processor, causes the processor to perform processes of: acquiring curve information indicating a curve; acquiring a character string; and generating display information for displaying the acquired character string along the curve indicated by the acquired curve information, wherein the processor determines, in a case of determining that a part of the acquired character string is not able to be displayed along the curve indicated by the acquired curve information because a length of the curve is short, a shape of an extended part of the curve from a shape of the curve, extends the curve, and generates display information for displaying the part of the character string along the curve of the extended part.

Advantageous Effects of Invention

According to the present invention, the display control unit determines, in a case of determining that a part of the character string acquired by the character string acquiring unit is not able to be displayed along the curve indicated by the curve information acquired by the curve information acquiring unit because the length of the curve is short, the shape of an extended part of the curve from the shape of the curve, extends the curve, and generates the display information for displaying the part of the character string along the curve of the extended part. Therefore, there is an effect to display the entire character string along the curve even when the length of the acquired curve is shorter than the length of the character string.

BRIEF DESCRIPTION OF DRAWINGS

FIG. 3 is a hardware configuration diagram of a computer in a case where the input display system is implemented by software, firmware and the like.

FIG. 6 is an explanatory diagram illustrating a character attribute table stored in a character management DB 2.

FIG. 8 is an explanatory diagram illustrating display processing in a case where a character string indicating a recognition result of a voice is output before a curve image is output.

FIG. 12C is an explanatory diagram illustrating an example in which the shape of an extended curve has a wavy line shape having the same cycle as the shape of an original curve, and FIG. 12D is an explanatory diagram illustrating an example in which the shape of an extended curve is an arc shape.

FIG. 16 is an explanatory diagram illustrating an example of display processing in a display processing unit 53 of a display control unit 51.

FIG. 17 is an explanatory diagram illustrating an example of the display processing in the display processing unit 53 of the display control unit 51.

FIG. 18 is an explanatory diagram illustrating an example of displaying a character string indicating a translation result.

FIG. 19 is an explanatory diagram illustrating an example of displaying a character string indicating a translation result.

DESCRIPTION OF EMBODIMENTS

Hereinafter, to describe the present invention in more detail, embodiments for implementing the present invention will be described with reference to accompanying drawings.

First Embodiment

Figure 1:
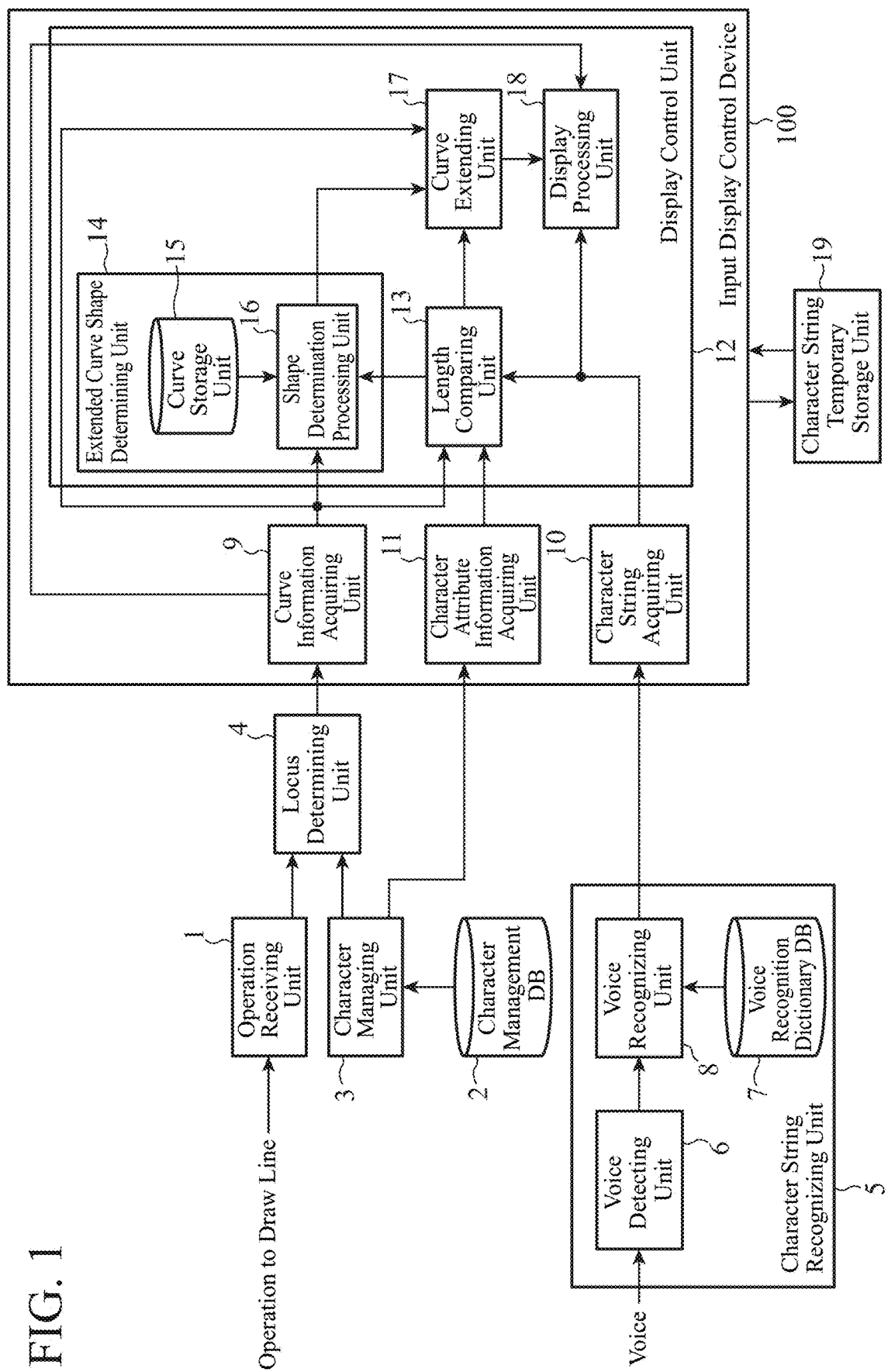
FIG. 1 is a configuration diagram illustrating an input display system including an input display control device according to a first embodiment of the present invention.
Figure 2:
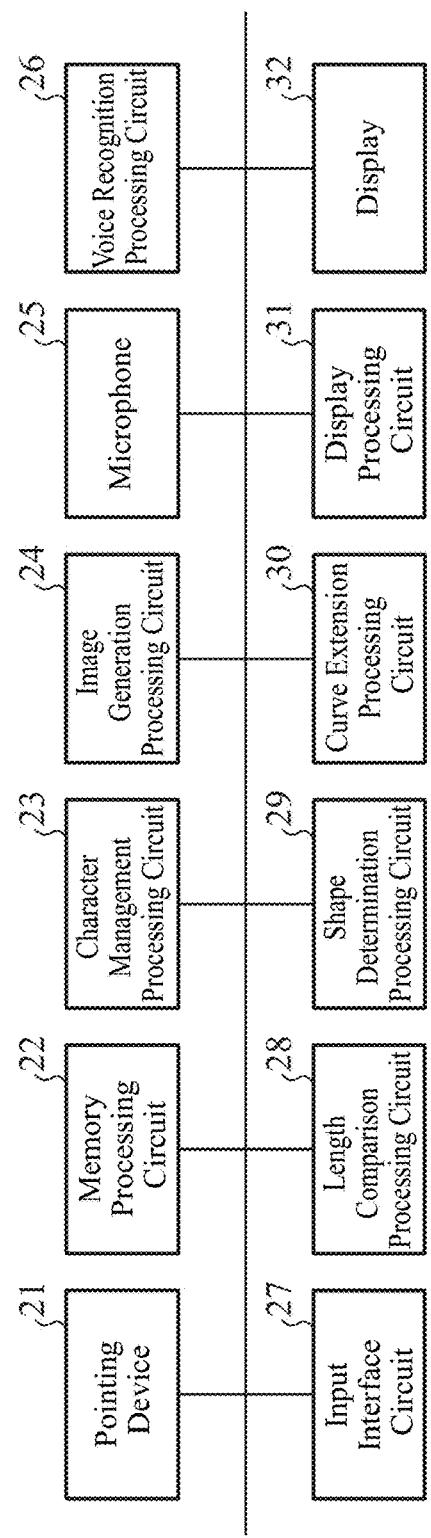
FIG. 2 is a hardware configuration diagram of the input display system according to the first embodiment of the present invention.

FIG. 1 is a configuration diagram illustrating an input display system including an input display control device according to a first embodiment of the present invention, and FIG. 2 is a hardware configuration diagram of the input display system according to the first embodiment of the present invention.

In FIGS. 1 and 2, an operation receiving unit 1 is implemented by a pointing device 21, and performs processing of receiving an operation to draw a line as a user operation.

In the first embodiment, a device using a touch panel is assumed as the pointing device 21. However, the pointing device 21 is not limited to the touch panel, and for example, a joystick, a pointing stick (track point), a touch pad, a stylus, a data glove, a track ball, a pen tablet, a mouse, a light pen, a joypad, or the like can be used.

A character management DB 2 is implemented by a memory processing circuit 22, for example, and stores a character attribute table indicating correspondence among a character type, a character size, a character height, and a character width.

A character managing unit 3 is implemented by a character management processing circuit 23, for example. In the character managing unit 3, the size of characters to be displayed on a display 32 is set in advance, and the character managing unit 3 performs processing of outputting character attribute information indicating the character height corresponding to the character size to a locus determining unit 4, and outputting character attribute information indicating the character height and the character width corresponding to the character size to an input display control device 100, with reference to the character attribute table stored in the character management DB 2.

The locus determining unit 4 is implemented by, for example, an image generation processing circuit 24, and performs processing of determining a locus of the line drawn by the operation received by the operation receiving unit 1, and outputting curve information indicating a length and a shape of a curve representing the locus to the input display control device 100. This curve includes lines having any shape, such as a straight line and a bent line.

Further, the locus determining unit 4 performs processing of generating a curve image that is an image of the curve representing the locus, and outputting the curve image to the input display control device 100. This curve image is included in the curve information and output to the input display control device 100.

The line width of the curve image corresponds to the character height indicated by the character attribute information output from the character managing unit 3.

A character string recognizing unit 5 includes a voice detecting unit 6, a voice recognition dictionary DB 7, and a voice recognizing unit 8, and performs processing of outputting a character string indicating a recognition result of a voice to the input display control device 100 as a character string to be displayed.

The voice detecting unit 6 is implemented by a microphone 25, for example, and detects the user's voice.

The voice recognition dictionary DB 7 is implemented by, for example, the memory processing circuit 22, and the voice recognition dictionary DB 7 is configured with, for example, an acoustic model in which acoustic features of a phoneme, which is a small unit of human utterance, are described, and a recognition dictionary in which words to be recognized as a voice are described.

The voice recognizing unit 8 is implemented by, for example, a voice recognition processing circuit 26, and has a voice recognition engine for recognizing a voice detected by the voice detecting unit 6.

That is, the voice recognizing unit 8 performs processing of analyzing a voice detected by the voice detecting unit 6, calculating acoustic features of the voice, searching words described in the recognition dictionary of the voice recognition dictionary DB 7 for a word having acoustic features closest to the calculated acoustic features, and outputting a character string indicating the word to the input display control device 100 as a character string indicating a recognition result of the voice.

FIG. 1 illustrates the example in which the character string recognizing unit 5 has the voice recognition dictionary DB 7 and the voice recognizing unit 8. However, a data transmitting/receiving unit may be mounted in place of the voice recognition dictionary DB 7 and the voice recognizing unit 8.

The data transmitting/receiving unit is, for example, a network communication device such as a network card capable of transmitting and receiving data to and from a voice recognition server (not illustrated) via a communication path such as the Internet or a LAN, and transmits data indicating the voice detected by the voice detecting unit 6 to the voice recognition server.

The voice recognition server has a voice recognition engine for recognizing a voice, and when receiving the data indicating the voice transmitted from the data transmitting/receiving unit, the voice recognition server recognizes the voice and transmits a character string indicating a recognition result of the voice to the data transmitting/receiving unit.

When receiving the character string indicating the recognition result of the voice transmitted from the voice recognition server, the data transmitting/receiving unit outputs the character string to the input display control device.

The input display control device 100 includes a curve information acquiring unit 9, a character string acquiring unit 10, a character attribute information acquiring unit 11, and a display control unit 12.

The curve information acquiring unit 9 is implemented by, for example, an input interface circuit 27 including a local area network (LAN) port, a universal serial bus (USB) port, and the like, and performs processing of acquiring the curve information output from the locus determining unit 4.

The character string acquiring unit 10 is implemented by, for example, the input interface circuit 27, and performs processing of acquiring the character string output from the character string recognizing unit 5.

The character attribute information acquiring unit 11 is implemented by, for example, the input interface circuit 27, and performs processing of acquiring the character attribute information output from the character managing unit 3.

The display control unit 12 includes a length comparing unit 13, an extended curve shape determining unit 14, a curve extending unit 17, and a display processing unit 18, and performs processing of generating display information for displaying the character string output from the character string recognizing unit 5 along the curve indicated by the curve information output from the locus determining unit 4, and displaying the character string along the curve in accordance with the display information. That is, the display control unit 12 performs processing of generating the display information for displaying the character string output from the character string recognizing unit 5 to be superimposed on the curve image included in the curve information acquired by the curve information acquiring unit 9, and superimposing and displaying the character string on the curve image in accordance with the display information.

Further, in a case of determining that a part of the character string output from the character string recognizing unit 5 cannot be displayed along the curve indicated by the curve information acquired by the curve information acquiring unit 9 because the length of the curve is short, the display control unit 12 performs processing of determining the shape of an extended part of the curve from the shape of the curve, extending the curve, generating display information for displaying the part of the character string along the curve of the extended part, and displaying the part of the character string in accordance with the display information.

Further, after superimposing and displaying the character string on the curve image, the display control unit 12 performs processing of generating display information for deleting the display of the curve image, and deleting the curve image in accordance with the display information.

The length comparing unit 13 is implemented by, for example, a length comparison processing circuit 28, and performs processing of comparing the length of the curve indicated by the curve information acquired by the curve information acquiring unit 9 and the length of the character string acquired by the character string acquiring unit 10.

The extended curve shape determining unit 14 is implemented by the shape determination processing circuit 29, for example, and includes a curve storage unit 15 and a shape determination processing unit 16. The extended curve shape determining unit 14 performs processing of determining the shape of an extended curve that is the curve of the extended part, from the shape of the curve indicated by the curve information acquired by the curve information acquiring unit 9, when a comparison result of the length comparing unit 13 indicates that the length of the curve is shorter than the length of the character string.

The curve storage unit 15 stores a plurality of curves having different shapes in advance.

The shape determination processing unit 16 performs processing of collating the shapes of the plurality of curves stored in the curve storage unit 15 and the shape of the curve indicated by the curve information acquired by the curve information acquiring unit 9, selecting a shape of a curve corresponding to the curve indicated by the curve information acquired by the curve information acquiring unit 9 from among the shapes of the plurality of curves stored in the curve storage unit 15, and determining the shape of the extended curve from the selected shape of a curve.

The curve extending unit 17 is implemented by, for example, a curve extension processing circuit 30, and performs processing of adding the extended curve having the shape determined by the extended curve shape determining unit 14 to an end of the curve indicated by the curve information acquired by the curve information acquiring unit 9 when the comparison result of the length comparing unit 13 indicates that the length of the curve is shorter than the length of the character string.

The display processing unit 18 is implemented by, for example, a display processing circuit 31, and performs processing of generating display information for displaying, on the display 32, the character string acquired by the character string acquiring unit 10 along the curve indicated by the curve information acquired by the curve information acquiring unit 9, and displaying the character string on the display 32 in accordance with the display information. That is, the display processing unit 18 performs processing of generating display information for superimposing and displaying the character string output from the character string acquiring unit 10 on the curve image acquired by the curve information acquiring unit 9, and superimposing and displaying the character string on the curve image on the display 32 in accordance with the display information.

Further, the display processing unit 18 performs processing of generating display information for displaying a part of the character string, which cannot be superimposed and displayed on the curve image, along the extended curve added by the curve extending unit 17 on the display 32, and displaying the part of the character string on the display 32 in accordance with the display information, when the comparison result of the length comparing unit 13 indicates that the length of the curve is shorter than the length of the character string.

Further, after displaying the character string on the display 32, the display processing unit 18 performs processing of generating display information for deleting the display of the curve image, and deleting the curve image on the display 32 in accordance with the display information.

A character string temporary storage unit 19 is implemented by, for example, the memory processing circuit 22, and temporarily stores the character string acquired by the character string acquiring unit 10.

In FIG. 1, each of the operation receiving unit 1, the character management DB 2, the character managing unit 3, the locus determining unit 4, the character string recognizing unit 5, the curve information acquiring unit 9, the character string acquiring unit 10, the character attribute information acquiring unit 11, the length comparing unit 13, the extended curve shape determining unit 14, the curve extending unit 17, the display processing unit 18, and the character string temporary storage unit 19, which are the constituent elements of the input display system, is supposed to be implemented by the dedicated hardware illustrated in FIG. 2, such as the pointing device 21, the memory processing circuit 22, the character management processing circuit 23, the image generation processing circuit 24, the microphone 25, the voice recognition processing circuit 26, the input interface circuit 27, the length comparison processing circuit 28, the shape determination processing circuit 29, the curve extension processing circuit 30, the display processing circuit 31, and the display 32.

Here, the memory processing circuit 22 corresponds to, for example, a nonvolatile or volatile semiconductor memory such as a random access memory (RAM), a read only memory (ROM), a flash memory, an erasable programmable read only memory (EPROM), or an electrically erasable programmable read only memory (EEPROM), a magnetic disk, a flexible disk, an optical disk, a compact disk, a mini disk, or a digital versatile disc (DVD).

Further, the character management processing circuit 23, the image generation processing circuit 24, the voice recognition processing circuit 26, the length comparison processing circuit 28, the shape determination processing circuit 29, the curve extension processing circuit 30, and the display processing circuit 31 correspond to, for example, a single circuit, a composite circuit, a programmed processor, a parallel programmed processor, an application specific integrated circuit (ASIC), a field-programmable gate array (FPGA), or a combination thereof.

Further, the constituent elements of the input display system are not limited to those implemented by the dedicated hardware, and the input display system may be implemented by software, firmware, or a combination of software and firmware.

The software and firmware are stored as programs in a memory of a computer. The computer means hardware for executing a program, and corresponds to, for example, a central processing unit (CPU), a central processor, a processing unit, an arithmetic unit, a microprocessor, a microcomputer, a processor, a digital signal processor (DSP), or the like.

Figure 3:
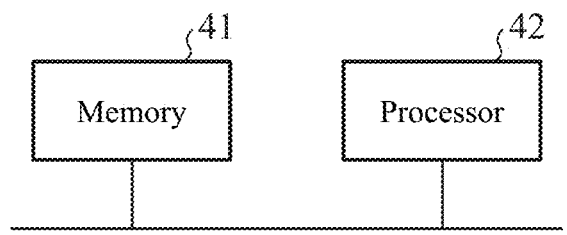

FIG. 3 is a hardware configuration diagram of a computer in a case where the input display system is implemented by software, firmware, or the like.

In a case where the input display system is implemented by software, firmware, or the like, the character management DB 2, the voice recognition dictionary DB 7, and the character string temporary storage unit 19 are configured on a memory 41 of the computer, and programs for causing the computer to execute processing procedures of the character managing unit 3, the locus determining unit 4, the voice recognizing unit 8, the curve information acquiring unit 9, the character string acquiring unit 10, the character attribute information acquiring unit 11, the length comparing unit 13, the extended curve shape determining unit 14, the curve extending unit 17, and the display processing unit 18 are stored in the memory 41, and a processor 42 may execute the programs stored in the memory 41.

Figure 4:
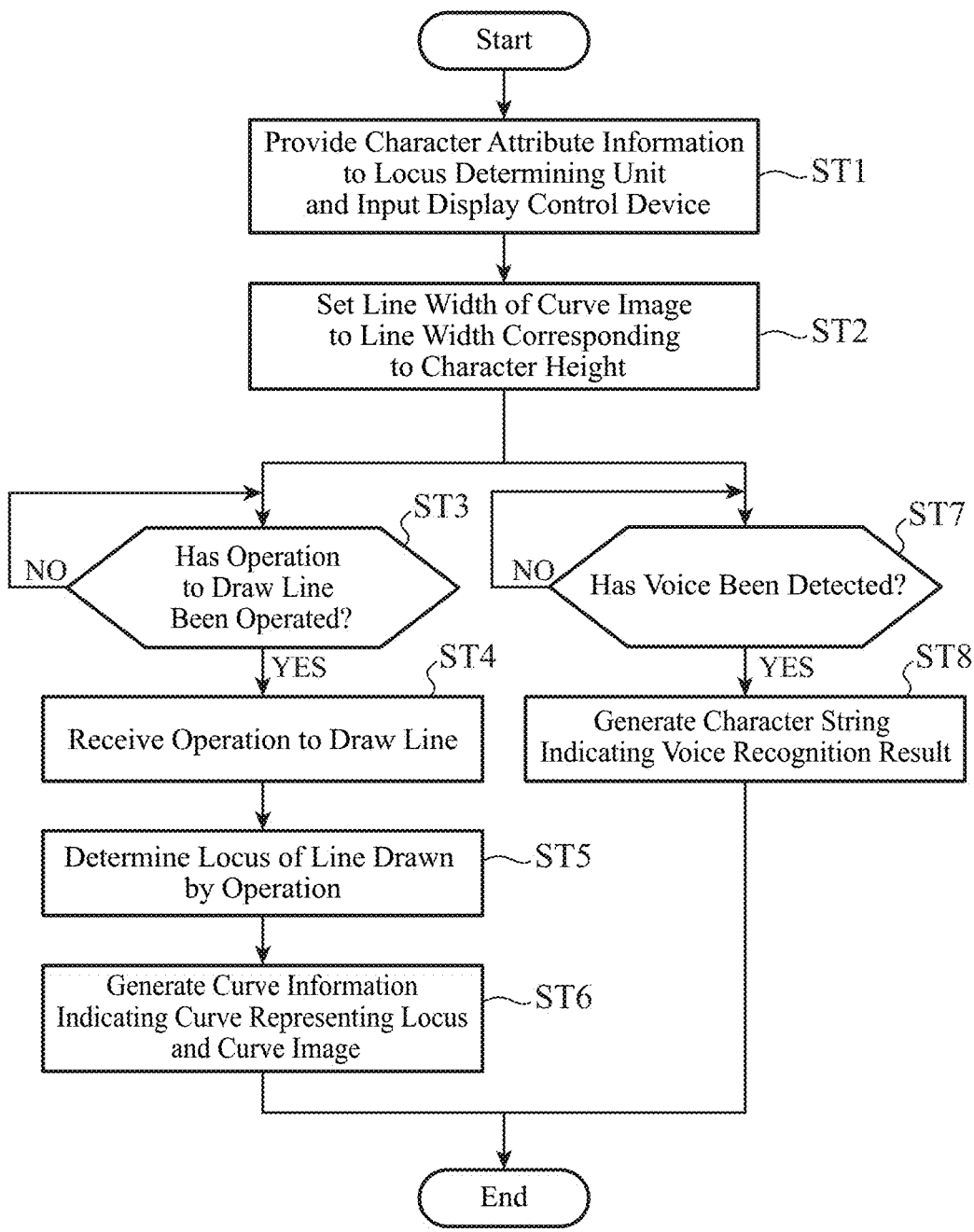
FIG. 4 is a flowchart illustrating an input display control method as processing content of the input display system according to the first embodiment of the present invention (part 1).
Figure 5:
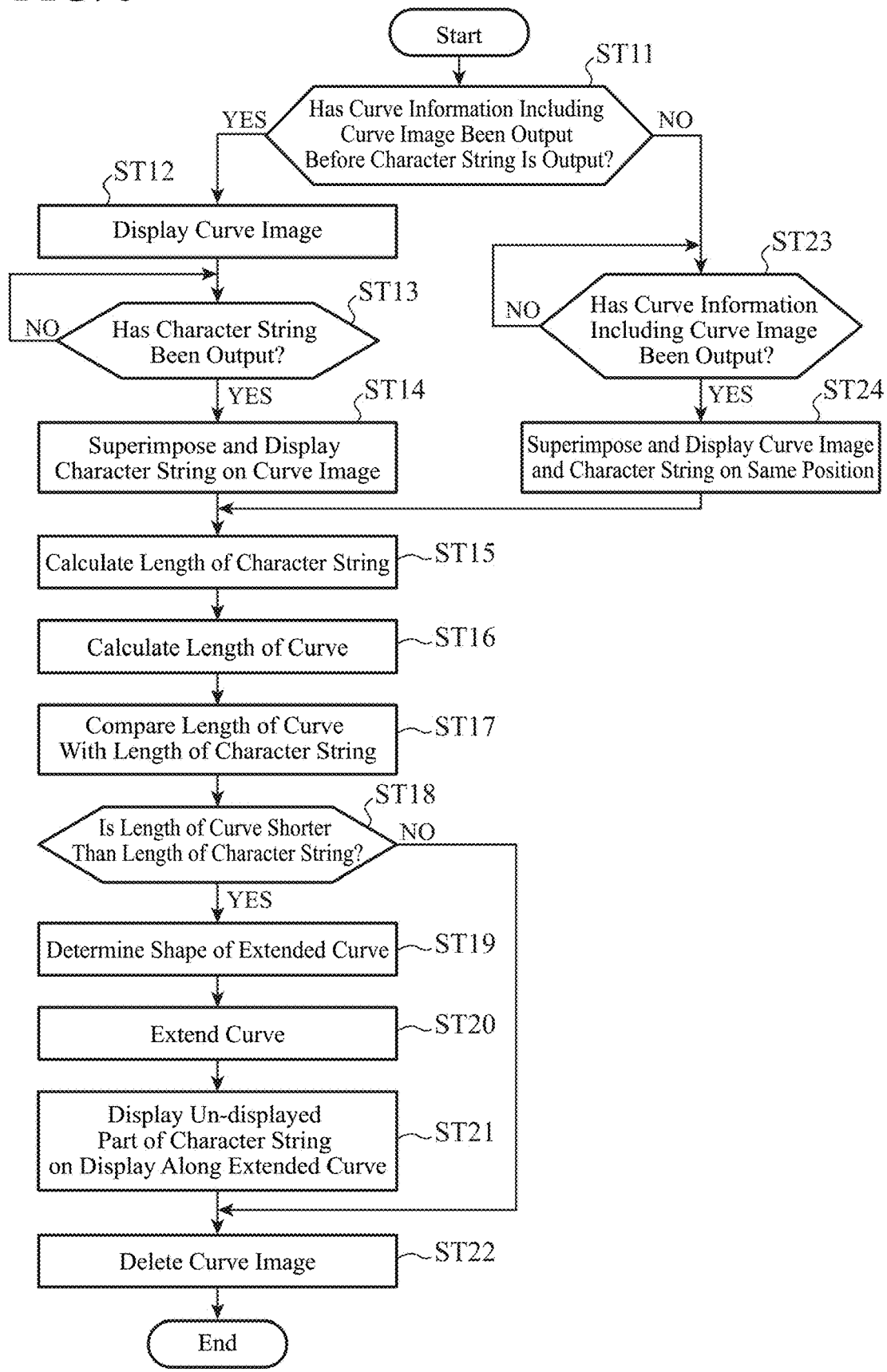
FIG. 5 is a flowchart illustrating an input display control method as processing content of the input display system according to the first embodiment of the present invention (part 2).

FIGS. 4 and 5 are flowcharts illustrating an input display control method as processing content of the input display system according to the first embodiment of the present invention.

Further, FIG. 2 illustrates the example in which each of the constituent elements of the input display system is implemented by the dedicated hardware, and FIG. 3 illustrates the example in which the input display system is implemented by software, firmware, or the like. However, some constituent elements in the input display system may be implemented by dedicated hardware and the remaining constituent elements may be implemented by software, firmware, or the like.

For example, the operation receiving unit 1 and the character string recognizing unit 5 can be implemented by dedicated hardware, and the character management DB 2, the character managing unit 3, the locus determining unit 4, the input display control device 100, and the character string temporary storage unit 19 can be implemented by software, firmware, or the like. Note that combinations of dedicated hardware and software are optional.

Next, an operation will be described.

FIG. 6 is an explanatory diagram illustrating a character attribute table stored in the character management DB 2.

In the character attribute table in FIG. 6, the character height and the character width corresponding to the character size are described for each character type, for example. As the character type, Mincho type, Gothic type, or the like can be considered.

In the character managing unit 3, the character type and the character size of characters to be displayed on the display 32 are set in advance, and the character managing unit 3 performs processing of outputting the character attribute information indicating the character height corresponding to the character type and the character size to the locus determining unit 4, and outputting the character attribute information indicating the character height and the character width corresponding to the character type and the character size to the input display control device 100, with reference to the character attribute table stored in the character management DB 2 (step ST1 in FIG. 4).

For example, when the character type of a character set in advance is "A" and its character size is "10", the character attribute information indicating that the character height is "5 mm" is output to the locus determining unit 4, and the character attribute information indicating that the character height is "5 mm" and the character width is "5 mm" is output to the input display control device 100.

Further, when the character type of a character set in advance is "B" and its character size is "5", the character attribute information indicating that the character height is "2 mm" is output to the locus determining unit 4, and the character attribute information indicating that the character height is "2 mm" and the character width is "1.25 mm" is output to the input display control device 100.

When receiving the character attribute information from the character managing unit 3, the locus determining unit 4 sets the line width of the curve image to be generated to the line width corresponding to the character height indicated by the character attribute information (step ST2).

For example, when the character height indicated by the character attribute information is "10 mm", and if upper and lower margins of the character are set to "0.5 mm", 10+0.5+0.5=11=(mm) is calculated, and the line width of the curve image is set to "11 mm".

Here, the example of providing the margins at the upper and lower portions of a character has been described. However, the character height indicated by the character attribute information and the line width of the curve image may match without providing the margins.

In the first embodiment, the pointing device 21 that implements the operation receiving unit 1 is assumed to be a touch panel. Therefore, when a user performs the operation, on the touch panel, to draw a line using his/her own finger or an input pen for touch panel (step ST3: YES), the operation receiving unit 1 outputs content of the operation to the locus determining unit 4 in response to the operation to draw a line (step ST4).

The content of the operation to draw a line to be output is, for example, time-series data indicating continuous change of coordinates of the position of the finger or the input pen touching the touch panel, that is, the position coordinates on the touch panel.

When receiving the content of the operation to draw a line from the operation receiving unit 1, the locus determining unit 4 determines a locus of the line drawn by the operation from the operation content (step ST5).

Since the content of the operation to draw a line indicates continuous change of the contact position to the touch panel as described above, the locus of the drawn line can be determined by connecting the time-series contact positions.

When determining the locus of the drawn line, the locus determining unit 4 generates curve information indicating the curve, such as the length and shape of the curve representing the locus.

Further, the locus determining unit 4 generates a curve image that is an image of the curve representing the locus, and outputs the curve information including the curve image to the input display control device 100 (step ST6).

The line width of the curve image is the line width set in step ST2, and in the above example, the line width of the curve image is set to "11 mm" and thus a curve image having the line width of "11 mm" is generated.

When the voice detecting unit 6 detects a user's voice (step ST7: YES), the voice recognizing unit 8 of the character string recognizing unit 5 executes recognition processing of the voice using the voice recognition dictionary DB 7 to generate a character string indicating a recognition result of the voice, and outputs the character string to the input display control device 100 (step ST8).

Although the voice recognition processing by the voice recognizing unit 8 is a known technology and thus detailed description is omitted, for example, a method of analyzing a voice detected by the voice detecting unit 6, calculating acoustic features of the voice, searching words described in the recognition dictionary of the voice recognition dictionary DB 7 for a word having acoustic features closest to the calculated acoustic features, and outputting a character string indicating the word as a character string indicating a recognition result of the voice is conceivable.

In the first embodiment, for convenience of description, assuming that the user utters "春になったら桜を見に行きましょう (Let's go to see the cherry blossoms in spring, shall we?)" and the voice recognizing unit 8 outputs a character string indicating "春になったら桜を見に行きましょう (Let's go to see the cherry blossoms in spring, shall we?)".

When the curve information including the curve image is output from the locus determining unit 4, the input display control device 100 displays the curve image on the display 32 and superimposes and displays the character string output from the character string recognizing unit 5 on the curve image.

Hereinafter, processing content of the input display control device 100 will be specifically described.

Figure 7:
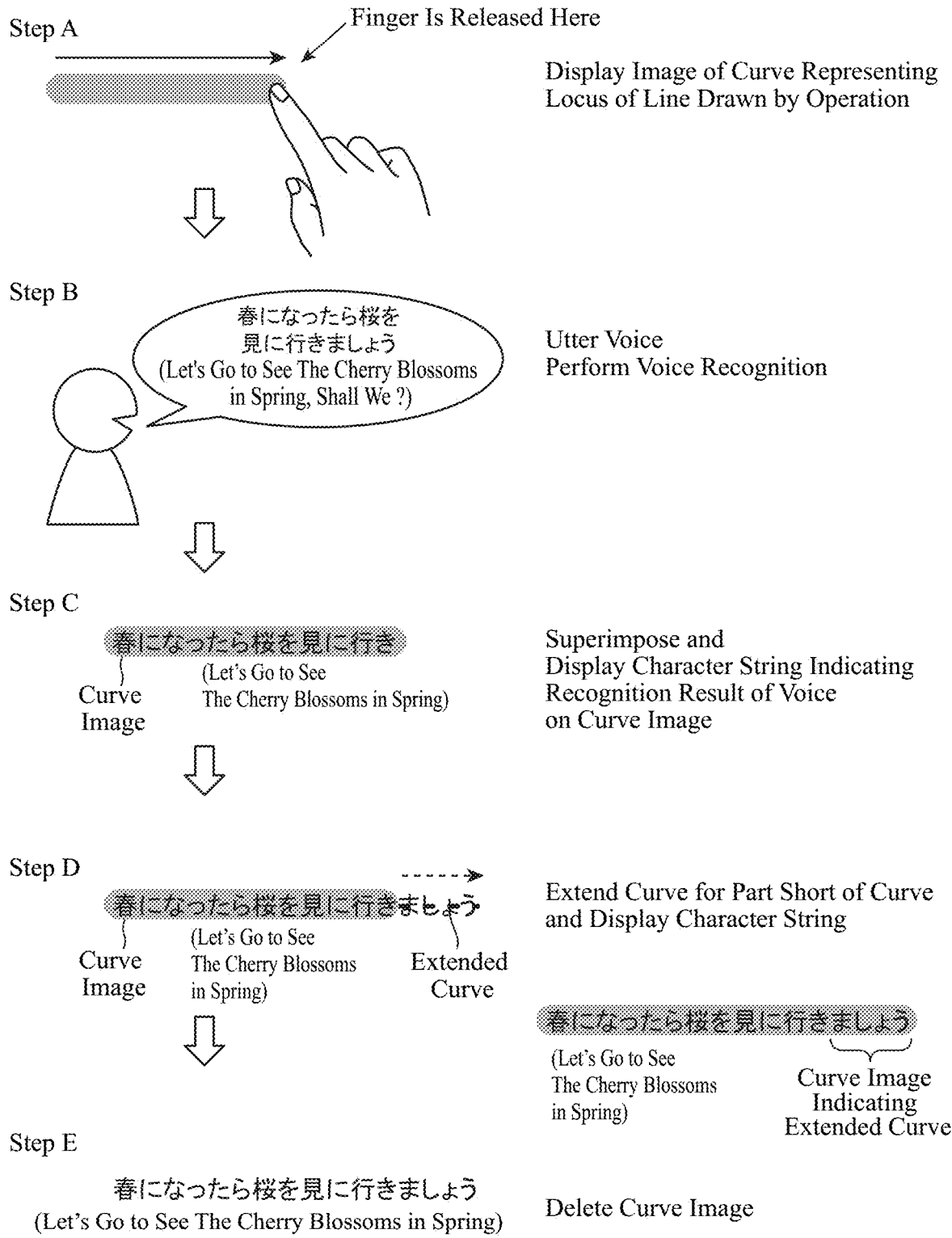
FIG. 7 is an explanatory diagram illustrating display processing in a case where a curve image is output before a character string indicating a recognition result of a voice is output.

FIG. 7 is an explanatory diagram illustrating display processing in a case where a curve image is output before a character string indicating a recognition result of a voice is output.

FIG. 8 is an explanatory diagram illustrating display processing in a case where a character string indicating a recognition result of a voice is output before a curve image is output.

Figure 9A:
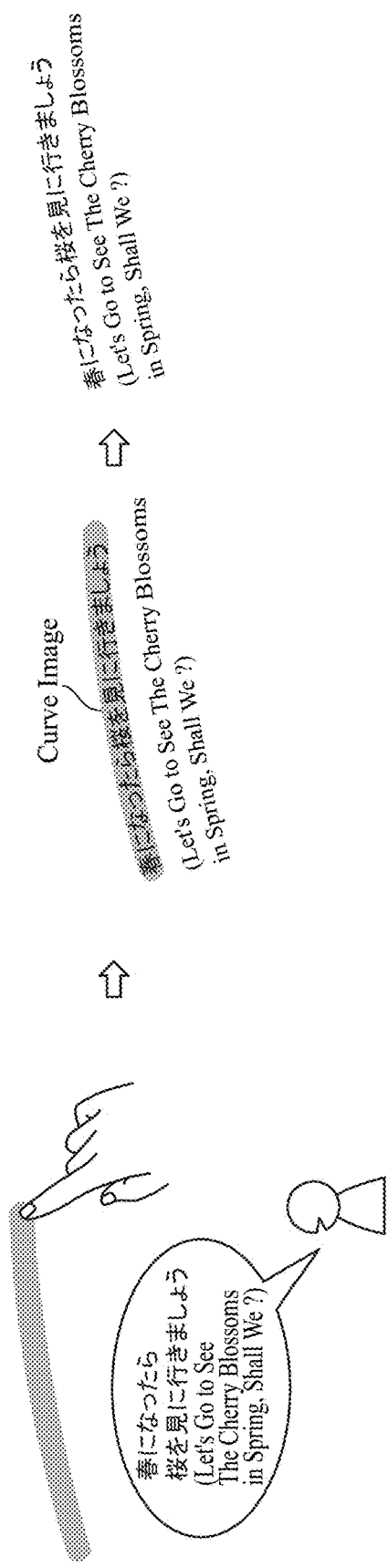
FIG. 9A is an explanatory diagram illustrating that all of characters constituting a character string can be superimposed and displayed on a curve image when the length of the curve is longer than the length of the character string.
Figure 9B:
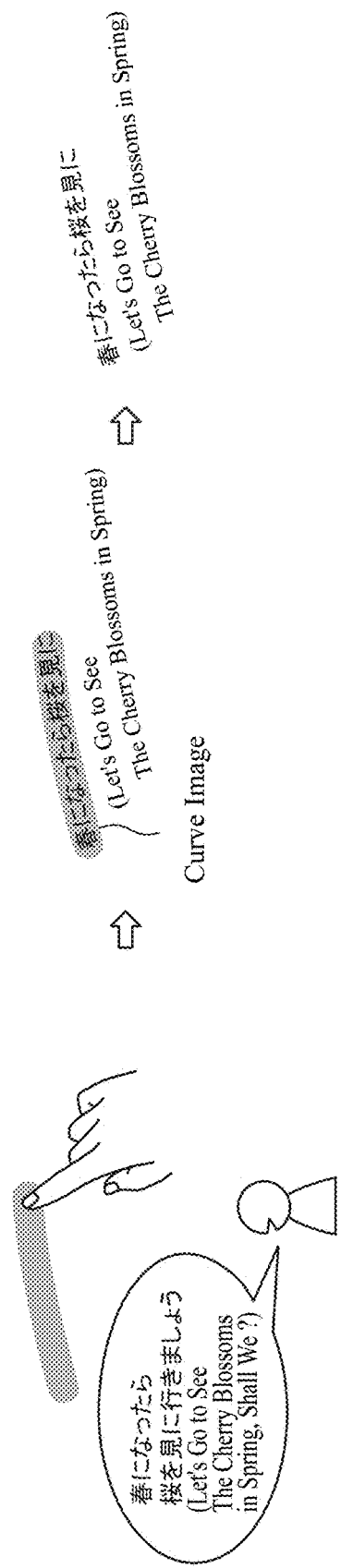
FIG. 9B is an explanatory diagram illustrating that a part of characters constituting a character string cannot be superimposed and displayed on a curve image when the length of the curve is shorter than the length of the character string.

FIG. 9 is explanatory diagrams illustrating a character string to be superimposed and displayed on a curve image. FIG. 9A illustrates an example in which all of characters constituting a character string can be superimposed and displayed on a curve image when the length of the curve is longer than the length of the character string. FIG. 9B illustrates an example in which a part of characters constituting a character string cannot be superimposed and displayed on a curve image when the length of the curve is shorter than the length of the character string.

Figure 10A:
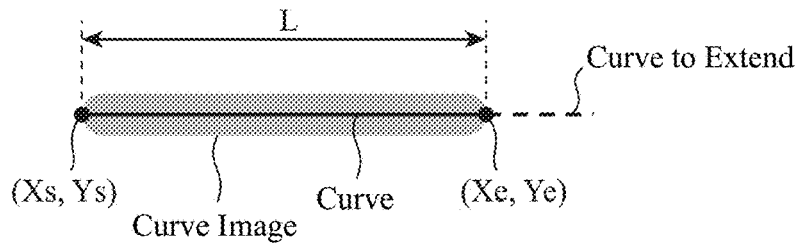
FIG. 10A is an explanatory diagram illustrating position coordinates of a top and an end of a curve to be used to calculate a length L of the curve in a case where the shape of the curve is a straight line.
Figure 10B:
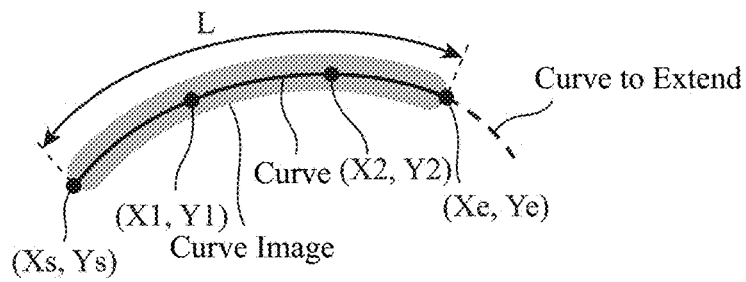
FIG. 10B is an explanatory diagram illustrating position coordinates of a top, an end, and an intermediate point of a curve used to calculate a length L of the curve in a case where the shape of the curve is bent.

FIG. 10 is explanatory diagrams illustrating processing content of the length comparing unit 13 of the display control unit 12. FIG. 10A illustrates position coordinates of a top and an end of a curve to be used to calculate a length L of the curve in a case where the shape of the curve is a straight line. FIG. 10B illustrates position coordinates of a top, an end, and an intermediate point of a curve used to calculate a length L of the curve in a case where the shape of the curve is bent.

Figure 11:
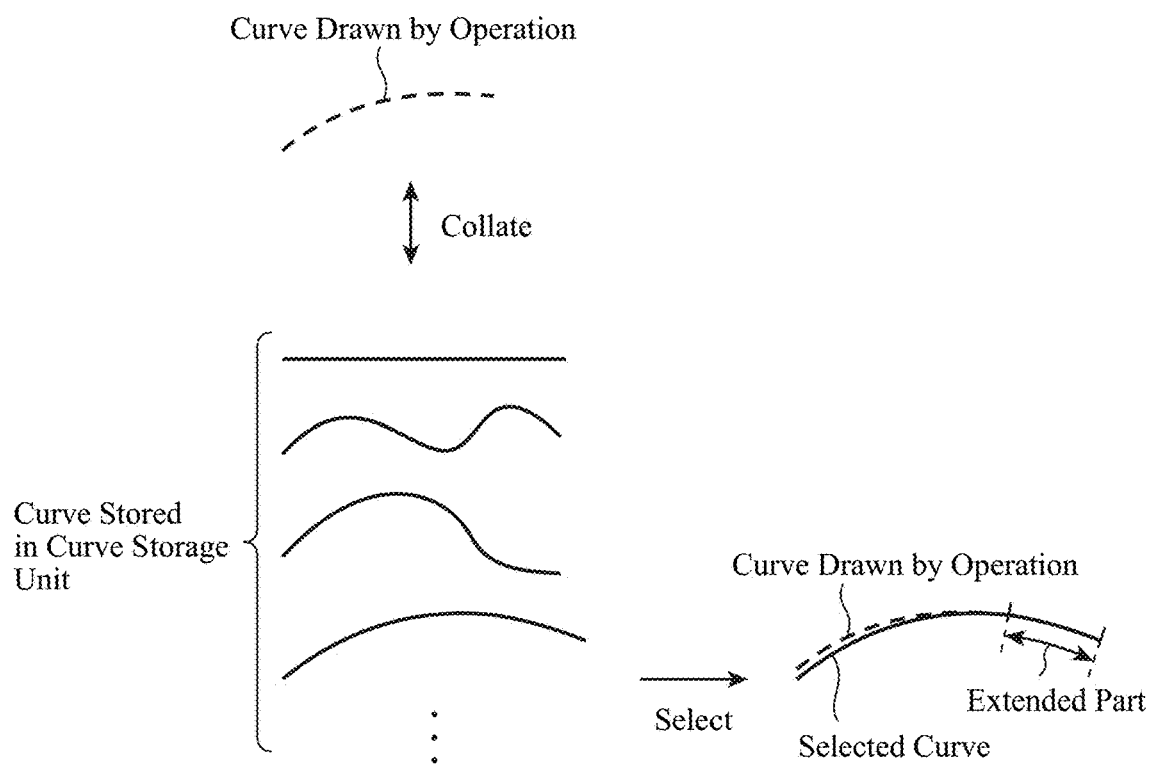
FIG. 11 is an explanatory diagram illustrating processing content of an extended curve shape determining unit 14 of a display control unit 12.

FIG. 11 is an explanatory diagram illustrating processing content of the extended curve shape determining unit 14 of the display control unit 12.

FIG. 12 is explanatory diagrams illustrating an example of the shape of an extended curve determined by the extended curve shape determining unit 14 of the display control unit 12.

Figure 13:
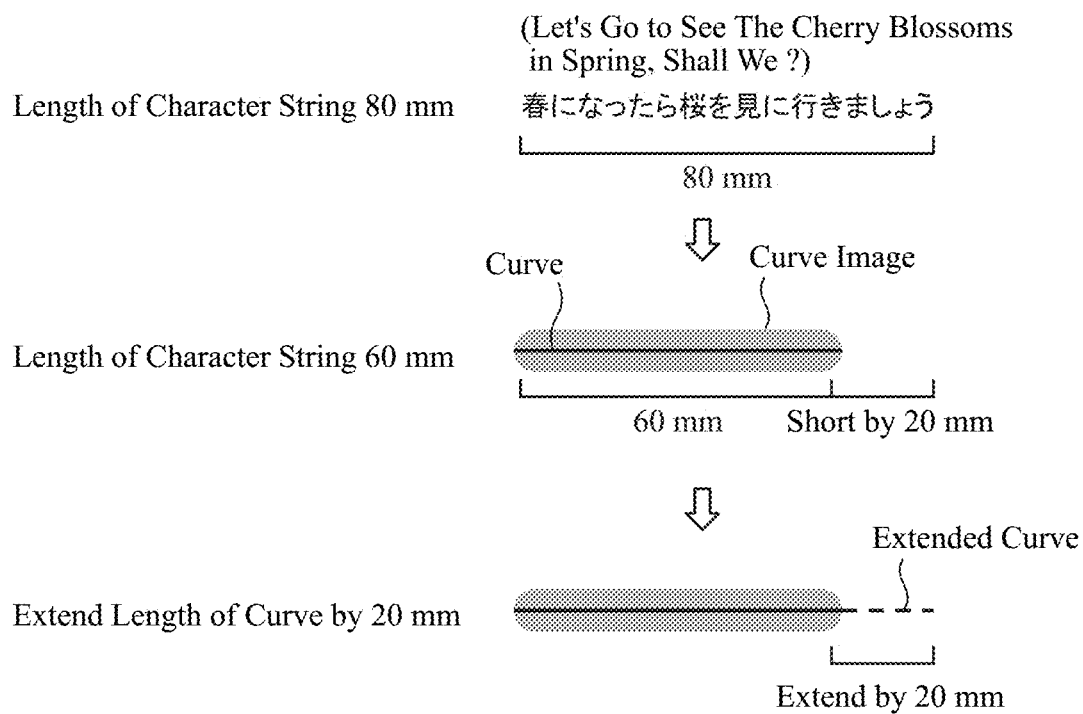
FIG. 13 is an explanatory diagram illustrating processing content of a curve extending unit 17 of the display control unit 12.

FIG. 13 is an explanatory diagram illustrating processing content of the curve extending unit 17 of the display control unit 12.

When the curve information acquiring unit 9 acquires the curve information on the basis of the output of the curve information including the curve image from the locus determining unit 4 before the character string is output from the voice recognizing unit 8 of the character string recognizing unit 5 (step ST11 in FIG. 5: YES), the display processing unit 18 of the display control unit 12 generates display information for displaying the curve image, and displays the curve image on the display 32 as illustrated in step A in FIG. 7 (step ST12).

In the first embodiment, for convenience of description, it is assumed that the length of the curve is shorter than the length of the character string that indicates the recognition result of the voice because the length of the line drawn by the operation of the user is short.

In displaying the curve image, the display processing unit 18 may display the entire curve image at the same time. However, the display processing unit 18 may display the curve image by animation in which the curve image is sequentially displayed from the head of the character string to be displayed later.

For example, as illustrated in step B in FIG. 7, when the user utters "春になっ たら桜を見に行き ましょう (Let's go to see the cherry blossoms in spring, shall we?)", and the display processing unit 18 receives the character string indicating "春に なったら桜を見に 行きましょう (Let's go to see the cherry blossoms in spring, shall we?)" from the voice recognizing unit 8 (step ST13 in FIG. 5: YES), the display processing unit 18 generates display information for superimposing and displaying the character string on the curve image, and superimposes and displays the character string on the curve image as illustrated in step C in FIG. 7 in accordance with the display information (step ST14).

However, in the example of FIG. 7, since the length of the curve is shorter than the length of the character string indicating the recognition result of the voice, the character string "春になったら桜を 見に行き (Let's go to see the cherry blossoms in spring, shall we?)" is superimposed and displayed on the curve image but "ましょう (shall we?)" is not superimposed and displayed on the curve image.

When the character string acquiring unit 10 acquires the character string indicating "春になったら桜を 見に行きましょう (Let's go to see the cherry blossoms in spring, shall we?)" output from the voice recognizing unit 8, the length comparing unit 13 of the display control unit 12 calculates the length of the character string with reference to the character width indicated by the character attribute information acquired by the character attribute information acquiring unit 11 after output from the character managing unit 3 (step ST15 in FIG. 5).

Here, the character string output from the voice recognizing unit 8 is "春にな ったら桜を見に行 きましょう (Let's go to see the cherry blossoms in spring, shall we?)" and the number of characters of the character string is 16. Therefore, for example, when the character width indicated by the character attribute information output from the character managing unit 3 is "5 mm", the length of the character string becomes 80 mm as illustrated in the following equation (1).

$$\text{Length of character string} = 5 \text{ mm} \times 16 = 80 \text{ mm} \tag{1}$$

Next, the length comparing unit 13 calculates the length of the curve indicated by the curve information acquired by the curve information acquiring unit 9 (step ST16).

The length L of the curve can be calculated from position coordinates (Xs, Ys) of the top and position coordinates (Xe, Ye) of the end of the curve, as illustrated in the following equation (2), when the shape of the curve is, for example, a straight line as illustrated in FIG. 10A. In the case of the curve image displayed in step A of FIG. 7, the left end of the curve is the top of the curve and the right end of the curve is the end of the curve. These position coordinates are assumed to have the same unit as the unit representing the character width and the like. Here, the unit is mm.

$$L = \sqrt{(Xe-Xs)^2 + (Ye-Ys)^2} \tag{2}$$

The equation (2) illustrates the calculation formula of the length L of the curve when the shape of the curve is a straight line. In the case where the shape of the curve is a curve as illustrated in FIG. 10B, for example, the length L of the curve can be calculated by approximating the shape of the curve by a straight line, using the position coordinates (Xs, Ys) of the top and the position coordinates (Xe, Ye) of the end of the curve, and position coordinates (Xn, Yn) (n=1, . . . N: N is an integer equal to or more than 1) of a plurality of intermediate points from the top to the end of the curve.

For example, in the case of N=2, the length L of the curve can be calculated from the position coordinates (Xs, Ys) of the top, the position coordinates (X1, Y1) of the intermediate point, the position coordinates (X2, Y2) of the intermediate point, and the position coordinates (Xe, Ye) of the end, of the curve, as illustrated in the following equation (3).

$$L = \sqrt{(X1-Xs)^2+(Y1-Ys)^2} + \sqrt{(X2-X1)^2+(Y2-Y1)^2} + \sqrt{(Xe-X2)^2+(Ye-Y2)^2} \tag{3}$$

In the equation (3), Xs<X1<X2<Xe is satisfied.

FIG. 10B illustrates the example of N=2. However, obviously, N may be equal to or more than 3, and the position coordinates (Xn, Yn) of a larger number of intermediate points may be used to enhance the approximation accuracy.

When calculating the length of the curve, the length comparing unit 13 compares the length of the curve and the length of the character string (step ST17 in FIG. 5).

The extended curve shape determining unit 14 determines the shape of an extended curve that is a curve of an extended part, from the shape of the curve indicated by the curve information acquired by the curve information acquiring unit 9, when a comparison result of the length comparing unit 13 indicates that the length of the curve is shorter than the length of the character string (step ST18 in FIG. 5: YES) (step ST19).

That is, the shape determination processing unit 16 of the extended curve shape determining unit 14 collates the shapes of the plurality of curves stored in the curve storage unit 15 and the shape of the curve indicated by the curve information acquired by the curve information acquiring unit 9, thereby specifying the shape of a curve having the highest degree of coincidence with the shape of the curve indicated by the curve information among the shapes of the plurality of curves stored in the curve storage unit 15, and selects the shape of the curve having the highest degree of coincidence. Since the processing of specifying the shape of the curve having the highest degree of coincidence by collating the shapes of the curves is a well-known technique, the detailed description is omitted.

When the shape determination processing unit 16 selects the shape of the curve as illustrated in FIG. 11 from among the shapes of the plurality of curves stored in the curve storage unit 15, the shape determination processing unit 16 determines the shape of the extended curve from the selected shape of the curve.

For example, when the lengths of the plurality of curves stored in the curve storage unit 15 are sufficiently longer than that of the curve representing the locus of the line drawn by the operation, the shape of a longer part than the curve indicated by the curve information, in the selected shape of the curve, is determined as the shape of the extended curve.

In the example of FIG. 11, the curve representing the locus of the line drawn by the operation, that is, the curve representing the locus determined by the locus determining unit 4 is illustrated by the broken line and the selected curve having the highest degree of coincidence is illustrated by the solid line, and the shape of the extended part of the curve illustrated by the broken line is made identical to the shape of the curve illustrated by the solid line.

In the first embodiment, the example of selecting the shape of the curve having the highest degree of coincidence with the shape of the curve representing the locus determined by the locus determining unit 4 from among the shapes of the plurality of curves stored in the curve storage unit 15, and determining the shape of the extended curve from the selected shape of the curve has been described.

However, the example is a mere example, and the shape of the extended curve that is the curve of the extended part may be determined by another method.

For example, a method of calculating change tendency of curvature of the shape of the curve representing the locus determined by the locus determining unit 4, and estimating the shape of the extended curve from the change tendency of curvature is conceivable.

Figure 12A:
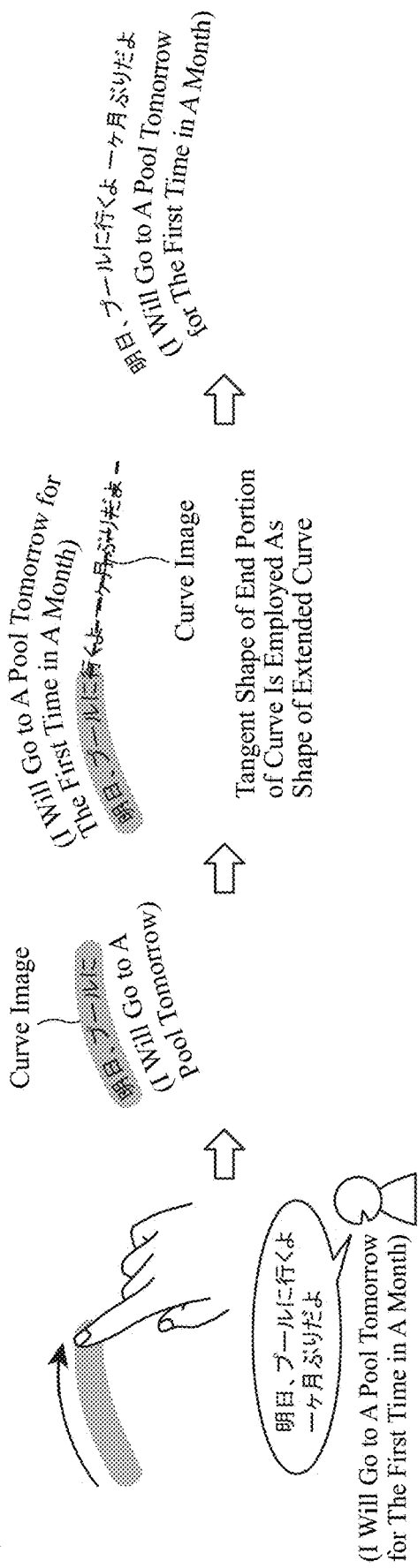
FIG. 12A is an explanatory diagram illustrating an example in which the shape of an extended curve is a tangent shape of an original curve at an end portion.

FIG. 12 illustrates examples of determining the shape of the extended curve, and in FIG. 12A, a tangent shape at an end portion of a gently bent curve is employed as the shape of the extended curve.

Figure 12B:
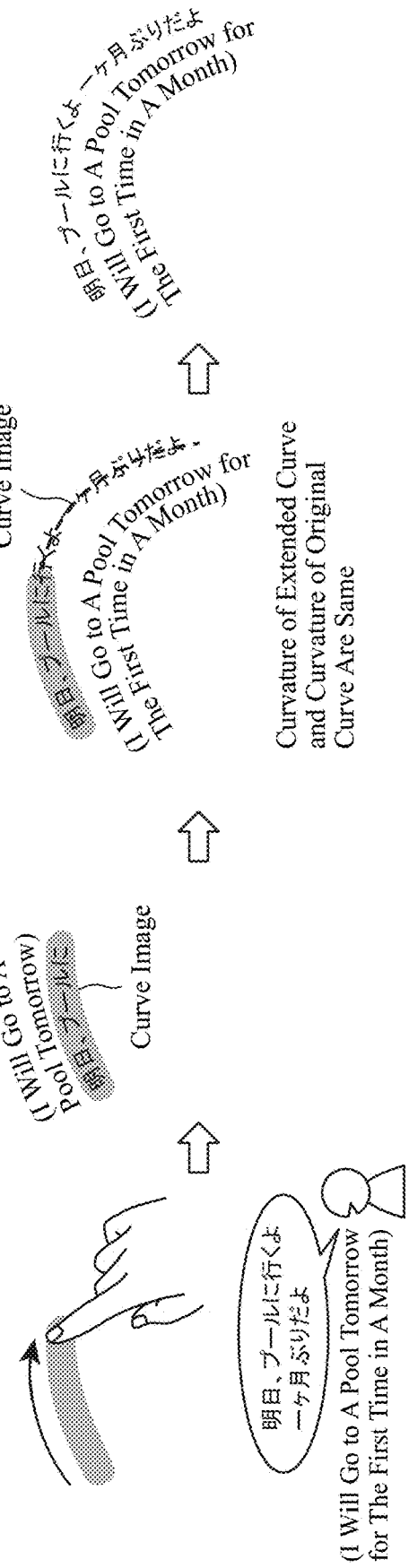
FIG. 12B is an explanatory diagram illustrating an example in which the shape of an extended curve has the same curvature as the shape of an original curve.

In FIG. 12B, since the curvature of the entire curve is constant, the curvature of the shape of the extended curve is set to be the same as the curvature of the shape of the original curve that is the curve representing the locus determined by the locus determining unit 4.

In FIG. 12C, since the shape of the curve is a cyclic wavy line shape, the shape of the extended curve is set to a wavy line shape having the same cycle as the original curve.

In FIG. 12D, since a part near the end of the curve is bent in an arc manner, the shape of the extended curve is formed into an arc shape similar to the part near the end of the original curve.

When the extended curve shape determining unit 14 determines the shape of the extended curve, the curve extending unit 17 extends the curve by adding the extended curve to the end of the curve indicated by the curve information acquired by the curve information acquiring unit 9 (step ST20).

In the example of FIG. 13, the length of the curve is 60 mm and the length of the character string is 80 mm, and the length of the curve is shorter than the length of the character string by 20 mm. Therefore, the curve is extended by 20 mm.

When the curve extending unit 17 extends the curve, the display processing unit 18 generates the display information for displaying "ましょう (shall we?)", which is the un-displayed part of the character string due to the short curve, along the curve of the extended part, and displays, on the display 32, the "ましょう (shall we?)", which is the un-displayed part of the character string due to the short curve, along the curve of the extended part, as illustrated in step D in FIG. 7, in accordance with the display information (step ST21).

Here, displaying the un-displayed part of the character string along the extended curve added by the curve extending unit 17 on the display 32 has been described. However, as illustrated on the right side in step D in FIG. 7, the curve image representing the extended curve may be displayed on the display 32, and the un-displayed part of the character string may be superimposed and displayed on the curve image.

After superimposing and displaying all the characters constituting the character string on the curve image, the display processing unit 18 generates the display information for deleting the curve image, and deletes the curve image and displays only the character string on the display 32, as illustrated in step E in FIG. 7, in accordance with the display information (step ST22).

In deleting the curve image, the display processing unit 18 may delete the entire curve image at the same time. However, the display processing unit 18 may delete the curve image by animation in which the curve image is sequentially deleted from the head of the character string.

Here, the curve image is supposed to be deleted after a certain period of time after the curve image and the character string are superimposed and displayed. However, the curve image may be deleted immediately after the display of the character string is completed.

As illustrated in step A in FIG. 8, when the user utters words before performing the operation to draw a line and the character string is output from the voice recognizing unit 8 of the character string recognizing unit 5 before the curve information including the curve image is output from the locus determining unit 4, and the character string acquiring unit 10 acquires the character string (step ST11 in FIG. 5: NO), the display processing unit 18 stores the character string in the character string temporary storage unit 19 and stands by until the curve information is output from the locus determining unit 4 (step ST23: NO).

After that, when the user starts the operation to draw a line and the operation is completed, the curve information is output from the locus determining unit 4.

When the curve information acquiring unit 9 acquires the curve information output by the locus determining unit 4 (step ST23: YES), the display processing unit 18 reads the character string from the character string temporary storage unit 19 and generates the display information for superimposing and displaying the character string on the curve image, and superimposes and displays the character string on the curve image, as illustrated in step B in FIG. 8, in accordance with the display information. That is, the display processing unit 18 superimposes and displays the curve image and the character string on the same position (step ST24).

However, in the example of FIG. 8, since the length of the curve is shorter than the length of the character string indicating the recognition result of the voice, the character string "春になったら桜を 見に行き (Let's go to see the cherry blossoms in spring, shall we?)" is superimposed and displayed on the curve image but "ましょう (shall we?)" is not superimposed and displayed on the curve image.

In superimposing and displaying the curve image and the character string on the same position, the display processing unit 18 may display the entire curve image and character string at the same time. However, the display processing unit 18 may display the curve image and the character string by animation in which the curve image and the character string are sequentially displayed from the head of the character string.

Alternatively, the curve image and the character string may be sequentially displayed in such a manner that the curve image and the character string gush out from under the finger in accordance with tracing with the finger of the user.

FIG. 7 illustrates the example in which the user utters words after tracing the display with his/her finger and FIG. 8 illustrates the example in which the user traces the display with his/her finger after uttering words. However, the tracing with the finger and the utterance may be performed at the same time.

When the character string acquiring unit 10 acquires the character string indicating "春になったら桜を 見に行きましょう (Let's go to see the cherry blossoms in spring, shall we?)" output from the voice recognizing unit 8, the length comparing unit 13 calculates the length of the character string in accordance with the above equation (1) with reference to the character width indicated by the character attribute information acquired by the character attribute information acquiring unit 11 after output from the character managing unit 3 (step ST15 in FIG. 5).

Further, when receiving the curve information acquired by the curve information acquiring unit 9, the length comparing unit 13 calculates the length of the curve indicated by the curve information in accordance with the above equation (2) or (3) (Step ST16).

When calculating the length of the curve, the length comparing unit 13 compares the length of the curve and the length of the character string (step ST17 in FIG. 5).

The extended curve shape determining unit 14 determines the shape of an extended curve that is a curve of an extended part, from the shape of the curve indicated by the curve information acquired by the curve information acquiring unit 9, when a comparison result of the length comparing unit 13 indicates that the length of the curve is shorter than the length of the character string (step ST18 in FIG. 5: YES) (step ST19).

When the extended curve shape determining unit 14 determines the shape of the extended curve, the curve extending unit 17 extends the curve by adding the extended curve to the end of the curve indicated by the curve information acquired by the curve information acquiring unit 9 (step ST20).

In the example of FIG. 13, the length of the curve is 60 mm and the length of the character string is 80 mm, and the length of the curve is shorter than the length of the character string by 20 mm. Therefore, the curve is extended by 20 mm.

When the curve extending unit 17 extends the curve, the display processing unit 18 generates the display information for displaying "ましょう (shall we?)", which is the un-displayed part of the character string due to the short length of the curve, along the curve of the extended part, and displays, on the display 32, "ましょう (shall we?)", which is the un-displayed part of the character string, along the curve of the extended part, as illustrated in step C in FIG. 8, in accordance with the display information (step ST21).

Here, displaying the un-displayed part of the character string along the extended curve added by the curve extending unit 17 on the display 32 has been described. However, as illustrated on the right side in step C in FIG. 8, the curve image representing the extended curve may be displayed on the display 32, and the un-displayed part of the character string may be superimposed and displayed on the curve image.

After superimposing and displaying all the characters constituting the character string on the curve image, the display processing unit 18 generates the display information for deleting the curve image, and deletes the curve image and displays only the character string on the display 32, as illustrated in step D in FIG. 8, in accordance with the display information (step ST22).

In deleting the curve image, the display processing unit 18 may delete the entire curve image at the same time. However, the display processing unit 18 may delete the curve image by animation in which the curve image is sequentially deleted from the head of the character string.

Here, the curve image is supposed to be deleted after a certain period of time after the curve image and the character string are superimposed and displayed. However, the curve image may be deleted immediately after the display of the character string is completed.

In the first embodiment, the example in which the length of the curve is shorter than the length of the character string indicating the recognition result of the voice has been described. However, in the case where the length of the curve is equal to or longer than the length of the character string indicating the recognition result of the voice, all the characters constituting the character string can be superimposed and displayed on the curve image without extending the length of the curve.

Therefore, when the comparison result of the length comparing unit 13 indicates that the length of the curve is equal to or longer than the length of the character string (step ST18 in FIG. 5: No), the processing proceeds to step ST22 without performing steps ST19 to ST21, and the curve image is deleted and only the character string is displayed.

In the first embodiment, the length comparing unit 13 calculates the length of the character string by the equation (1), assuming that the characters constituting the character string are not separated and the length between the characters is 0 mm. However, when the length between the characters is larger than 0 mm, the length of the character string may be calculated in consideration of the length between the characters. For example, when the length between characters is 0.5 mm, the length of the character string becomes 87.5 mm, as illustrated in the following equation (4).

$$\text{Length of character string} = (5\ \text{mm} \times 16) + (0.5\ \text{mm} \times 15) = 87.5\ \text{mm} \quad (4)$$

The equation (4) illustrates the case where the number of characters of the character string is 16 and the character width is "5 mm", similarly to the equation (1).

As is clear from the above description, according to the first embodiment, in the case where the display control unit 12 determines that a part of the character string acquired by the character string acquiring unit 10 cannot be displayed along the curve indicated by the curve information acquired by the curve information acquiring unit 9 because the length of the curve is short, the display control unit 12 determines the shape of the extended part of the curve from the shape of the curve indicated by the curve information acquired by the curve information acquiring unit 9, extends the curve, and generates the display information for displaying the part of the character string along the curve of the extended part. Therefore, there is an effect to display the entire character string along the curve even when the length of the curve is shorter than the length of the character string.

Further, according to the first embodiment, the input display control device 100 superimposes and displays the character string output from the voice recognizing unit 8 of the character string recognizing unit 5 on the curve image after displaying the curve image on the display 32 in the case where the curve information including the curve image is output from the locus determining unit 4 before the character string is output from the voice recognizing unit 8 of the character string recognizing unit 5, and the input display control device 100 stands by until the curve information is output from the locus determining unit 4, and displays the curve image on the display 32 and superimposes and displays the character string on the curve image when the curve information is output from the locus determining unit 4 in the case where the character string is output from the voice recognizing unit 8 of the character string recognizing unit 5 before the curve information including the curve image is output from the locus determining unit 4. Therefore, when the user performs the operation to draw a line before uttering words, the position where the character string indicating the recognition result of the voice is to be displayed can be grasped in advance. Therefore, an effect to enable the user to grasp a display image of the character string is exhibited. In addition, in the case where the user utters words before performing the operation to draw a line, when the operation to draw a line is performed, the curve image and the character string are superimposed and displayed on the same position. Therefore, an effect to provide highly responsive operability to the user is exhibited.

In the first embodiment, the example in which the input display control device 100 superimposes and displays the character string on the curve image has been described. However, the character string may be displayed along the curve image in the vicinity of the curve image without superimposing the character string on the curve image.

Further, the curve image may be a colorless transparent image as long as the user does not need to check the curve image. Further, the curve image may be a colored transparent image.

In the case where the curve image is colorless and transparent, the display processing unit 18 of the display control unit 12 may display a curve without a width representing the locus determined by the locus determining unit 4 or a curve without a width representing the locus extended by the curve extending unit 17 on the display 32.

Second Embodiment

In the first embodiment, the character string acquired by the character string acquiring unit 10 has been displayed on the display 32 along the curve indicated by the curve information acquired by the curve information acquiring unit 9. However, the character string may be translated and a character string indicating a translation result may be displayed on the display 32.

Figure 14:
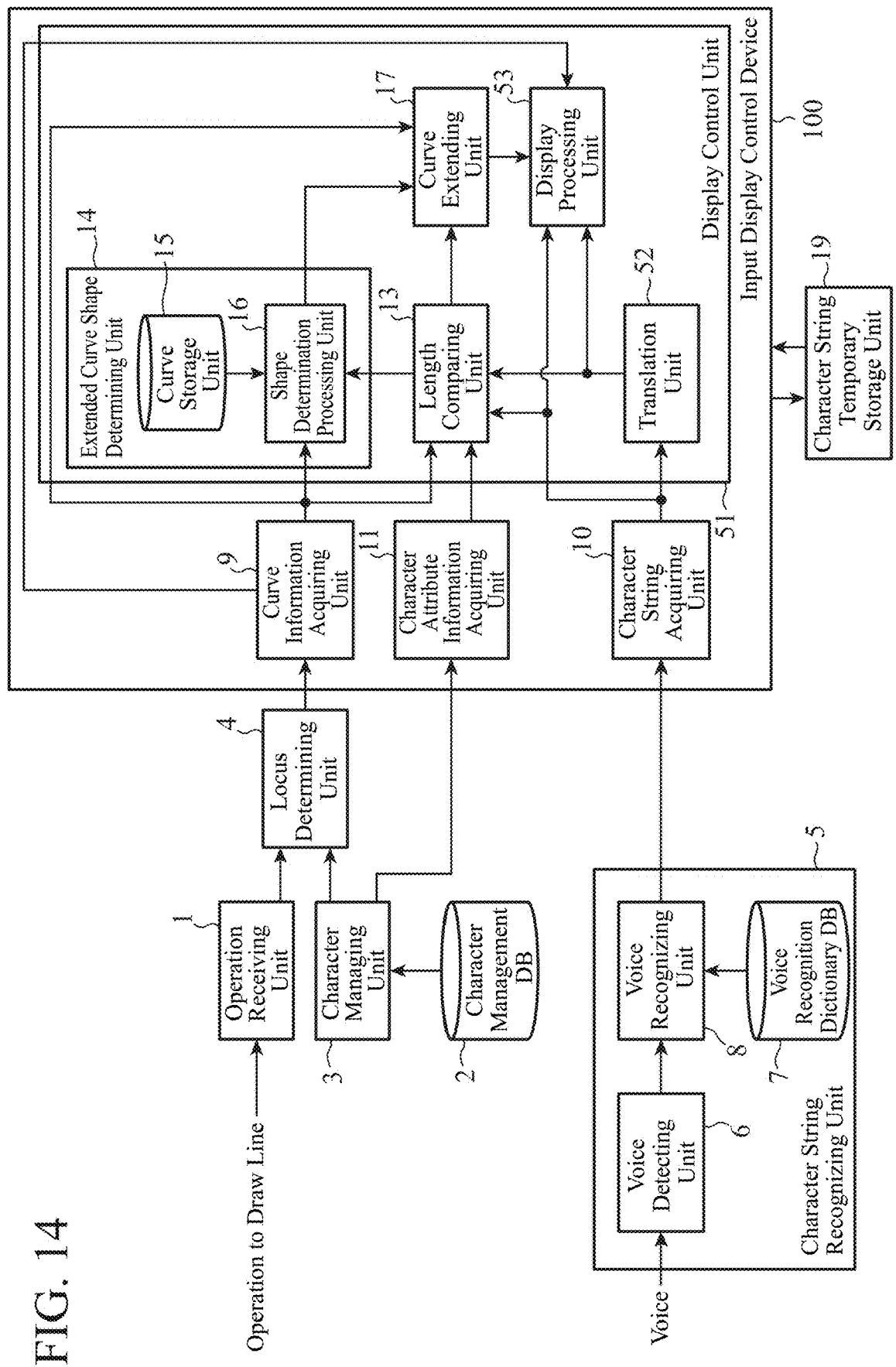
FIG. 14 is a configuration diagram illustrating an input display system including an input display control device according to a second embodiment of the present invention.
Figure 15:
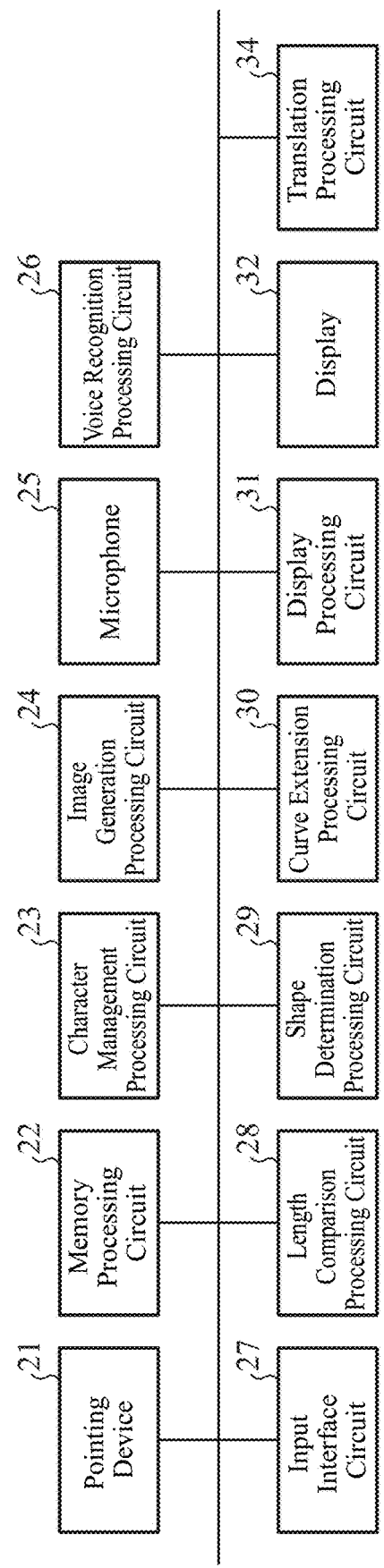
FIG. 15 is a hardware configuration diagram of the input display system according to the second embodiment of the present invention.

FIG. 14 is a configuration diagram illustrating an input display system including an input display control device according to a second embodiment of the present invention, and FIG. 15 is a hardware configuration diagram of the input display system according to the second embodiment of the present invention.

In FIGS. 14 and 15, the same reference numeral as that in FIGS. 1 and 2 represents the same or corresponding part, and thus description thereof is omitted.

A translation unit 52 is implemented by a translation processing circuit 34 configured with a semiconductor integrated circuit on which a CPU is mounted or a one-chip microcomputer, and performs processing of translating a character string acquired by a character string acquiring unit 10.

A display control unit 51 includes a length comparing unit 13, an extended curve shape determining unit 14, a curve extending unit 17, the translation unit 52, and a display processing unit 53, and performs processing of generating a curve for translated character string display having a length equal to or longer than a length of a character string indicating a translation result of the translation unit 52, generating display information for displaying the character string indicating the translation result of the translation unit 52 on a display 32 along the curve for translated character string display, and displaying, on the display 32, the character string indicating the translation result of the translation unit 52 in accordance with the display information, in addition to performing similar processing to the display control unit 12 in FIG. 1.

The display processing unit 53 of the display control unit 51 is implemented by a display processing circuit 31, for example, and performs similar processing to the display processing unit 18 in FIG. 1.

Further, the display processing unit 53 also performs, unlike the display processing unit 18 in FIG. 1, processing of generating a curve for translated character string display having a length equal to or longer than the length of the character string indicating a translation result of the translation unit 52, and displaying, on the display 32, the character string indicating the translation result of the translation unit 52 along the curve for translated character string display.

In FIG. 14, each of the operation receiving unit 1, the character management DB 2, the character managing unit 3, the locus determining unit 4, the character string recognizing unit 5, the curve information acquiring unit 9, the character string acquiring unit 10, the character attribute information acquiring unit 11, the length comparing unit 13, the extended curve shape determining unit 14, the curve extending unit 17, the translation unit 52, the display processing unit 53, and the character string temporary storage unit 19, which are the constituent elements of the input display system, is supposed to be implemented by the dedicated hardware illustrated in FIG. 15, that is, the pointing device 21, the memory processing circuit 22, the character management processing circuit 23, the image generation processing circuit 24, the microphone 25, the voice recognition processing circuit 26, the input interface circuit 27, the length comparison processing circuit 28, the shape determination processing circuit 29, the curve extension processing circuit 30, the display processing circuit 31, the display 32, and the translation processing circuit 34. However, the input display system may be implemented by software, firmware, or a combination of software and firmware.

In a case where the input display system is implemented by software, firmware, or the like, the character management DB 2, the voice recognition dictionary DB 7, and the character string temporary storage unit 19 are configured on a memory 41 of the computer illustrated in FIG. 3, and programs for causing a computer to execute processing procedures of the operation receiving unit 1, the character managing unit 3, the locus determining unit 4, the voice detecting unit 6, the voice recognizing unit 8, and the display control unit 51 are stored in the memory 41, and a processor 42 illustrated in FIG. 3 may execute the programs stored in the memory 41.

Next, an operation will be described.

Note that the operation is similar to that in the first embodiment except the translation unit 52 and the display processing unit 53, and thus here, processing content of the translation unit 52 and the display processing unit 53 will be mainly described.

When the character string acquiring unit 10 acquires a character string indicating a recognition result of a voice output from the character string recognizing unit 5, the translation unit 52 translates the character string and outputs a character string indicating the translation result to the length comparing unit 13 and the display processing unit 53.

In a case where the character string indicating the recognition result of the voice is "夏休みに海に行ったよ (I went to the sea on summer vacation)", for example, the character string indicating the translation result becomes "I went to the sea on summer vacation".

The display processing unit 53 superimposes and displays the character string indicating the recognition result of the voice acquired by the character string recognizing unit 5 on a curve image acquired by the curve information acquiring unit 9, similarly to the display processing unit 18 in FIG. 1.

Further, in a case where the length of the curve indicated by curve information acquired by the curve information acquiring unit 9 is shorter than the length of the character string and thus a part of the character string cannot be displayed along the curve, the display processing unit 53 displays, on the display 32, the part of the character string along an extended curve added by the curve extending unit 17, similarly to the display processing unit 18 in FIG. 1.

When receiving the character string indicating the translation result from the translation unit 52, the display processing unit 53 generates the curve for translated character string display having the length equal to or longer than the length of the character string indicating the translation result.

At this time, character attribute information indicating a character width of characters constituting the character string indicating the translation result is received from the character managing unit 3.

For example, in a case where the character string indicating the translation result is "I went to the sea in summer vacation", the number of characters including the space is 36, and thus when the character width of the characters constituting the character string indicating the translation result is "2 mm", the length of the character string indicating the translation result is 72 mm, as illustrated in the following equation (5).

$$\text{Length of character string indicating translation result} = 2 \text{ mm} \times 36 = 72 \text{ mm} \quad (5)$$

Therefore, in this case, the length of the curve for translated character string display is equal to or longer than 72 mm.

Further, the shape of the curve for translated character string display is set to the same shape as that of a curve representing a locus of a line drawn by a user's operation, that is, the curve indicated by the curve information acquired by the curve information acquiring unit 9. In the case where the curve is extended by the curve extending unit 17, the same shape as that of the curve extended by the curve extending unit 17 is set.

For example, the shape of the curve for translated character string display is an arc shape when the shape of the curve representing the locus of the line drawn by the user's operation is an arc shape, and the shape of the curve for translated character string display is a wavy line shape when the shape of the locus of the line drawn by the user's operation is a wavy line shape.

Note that, when the curve is extended by the curve extending unit 17 and the length of the curve for translated character string display is longer than the length of the curve extended by the curve extending unit 17, or when the curve is not extended by the curve extending unit 17 and the length of the curve for translated character string display is longer than the length of the curve indicated by the curve information acquired by the curve information acquiring unit 9, the shape of the extended part of the curve for translated character string display is determined from the shape of the curve for translated character string display, and the curve for translated character string display is extended, by a similar method to the case of extending the curve indicated by the curve information.

When the display processing unit 53 generates the curve for translated character string display, the display processing unit 53 generates display information for displaying, on the display 32, the character string indicating the translation result along the curve for translated character string display, and displays, on the display 32, the character string indicating the translation result in accordance with the display information.

Here, FIG. 16 is an explanatory diagram illustrating an example of display processing in the display processing unit 53 of the display control unit 51.

In step A, a curve image of a curve representing a locus of a line drawn by the user's operation is displayed on the display 32.

When user voice recognition processing is performed in step B, a character string indicating the recognition result of the voice is superimposed and displayed on the curve image in step C. Steps A to C are similar to those in the first embodiment. Note that, here, an example of a case where the curve information including the curve image is output before the character string indicating the recognition result of the voice is output is illustrated.

In step D, the character string indicating the translation result is displayed on the display 32 along the curve for translated character string display having the same shape as the curve representing the locus of the line drawn by the user's operation.

In the example of FIG. 16, the display processing unit 53 arranges the curve for translated character string display under the curve representing the locus of the line drawn by the user's operation. However, the curve for translated character string display may be arranged above, on the right, or on the left of the curve representing the locus of the line drawn by the user's operation.

In step E, the curve image of the curve representing the locus of the line drawn by the user's operation is deleted.

In the second embodiment, the display processing unit 53 has displayed the curve for translated character string display on the display 32. However, the curve for translated character string display may be transparent.

In the second embodiment, the character string indicating the recognition result of the voice and the character string indicating the translation result have been displayed up and down or side by side. However, as illustrated in FIG. 17, after the character string indicating the recognition result of the voice is displayed in step C, the character string indicating the translation result may be superimposed and displayed on the curve image from the head while deleting the character string indicating the recognition result of the voice from the head in step D.

In this case, the character string finally displayed is only the character string indicating the translation result.

Further, in the second embodiment, as illustrated in FIG. 18, the display processing unit 53 may display a character string indicating a result of back translation up and down or side by side with the character string indicating the recognition result of the voice and the character string indicating the translation result.

The second embodiment illustrates the example of translating the voice from Japanese to English and thus in this case, the back translation means re-translating the translated English into Japanese.

In the example of FIG. 18, in step D, a character string in English indicating the translation result is displayed under the character string in Japanese indicating the recognition result of the voice, and the character string in Japanese indicating the back translation is displayed under the character string in English.

Further, as illustrated in FIG. 19, in step D, after the character string in Japanese indicating the recognition result of the voice superimposed and displayed on the curve image is deleted, the character string in English indicating the translation result may be superimposed and displayed on the curve image, and the character string in Japanese indicating the back translation may be displayed under the character string in English.

As is clear from the above description, according to the second embodiment, the translation unit 52 that translates the character string acquired by the character string acquiring unit 10 is included, and the display processing unit 53 generates the curve for translated character string display having the length equal to or longer than the length of the character string indicating the translation result of the translation unit 52, and generates the display information for displaying the character string indicating the translation result of the translation unit 52 on the display 32 along the curve for translated character string display. Therefore, similarly to the first embodiment, an effect to display the entire character string along the curve is exhibited even when the length of the curve representing the locus of the line drawn by the operation to draw a line is shorter than the character string indicating the translation result of the translation unit 52.

Figure 20:
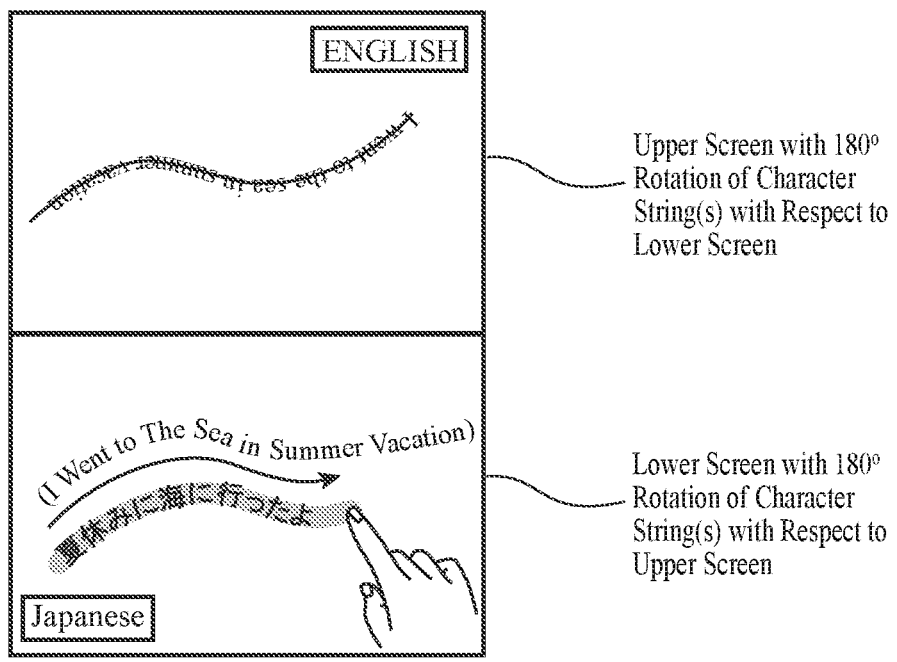
FIG. 20 is an explanatory diagram illustrating an example of display processing in the display processing unit 53 in a case where a display 32 is configured with face to face back-to-back two screens.

In the second embodiment, the character string indicating the recognition result of the voice and the character string indicating the translation result have been displayed up and down or side by side. However, as illustrated in FIG. 20, in a case where the display 32 is configured with two screens and has a back-to-back configuration in which upper sides of the two screens are in contact with each other, a character string indicating a recognition result of a voice may be displayed on a screen, shown on the lower side of the figure, of the back-to-back two screens and a character string indicating a translation result may be displayed on a screen, shown on the upper side of the figure, of the back-to-back two screens in FIG. 20, for example.

Alternatively, a character string indicating a translation result may be displayed on the screen, shown on the lower side of the figure, of the back-to-back two screens and a character string indicating a recognition result of a voice may be displayed on the screen, shown on the upper side of the figure, of the back-to-back two screens.

Note that since the screens are the back-to-back two screens, characters are rotated by 180 degrees on the screen, shown on the upper side of the figure, of the back-to-back two screens.

Figure 21:
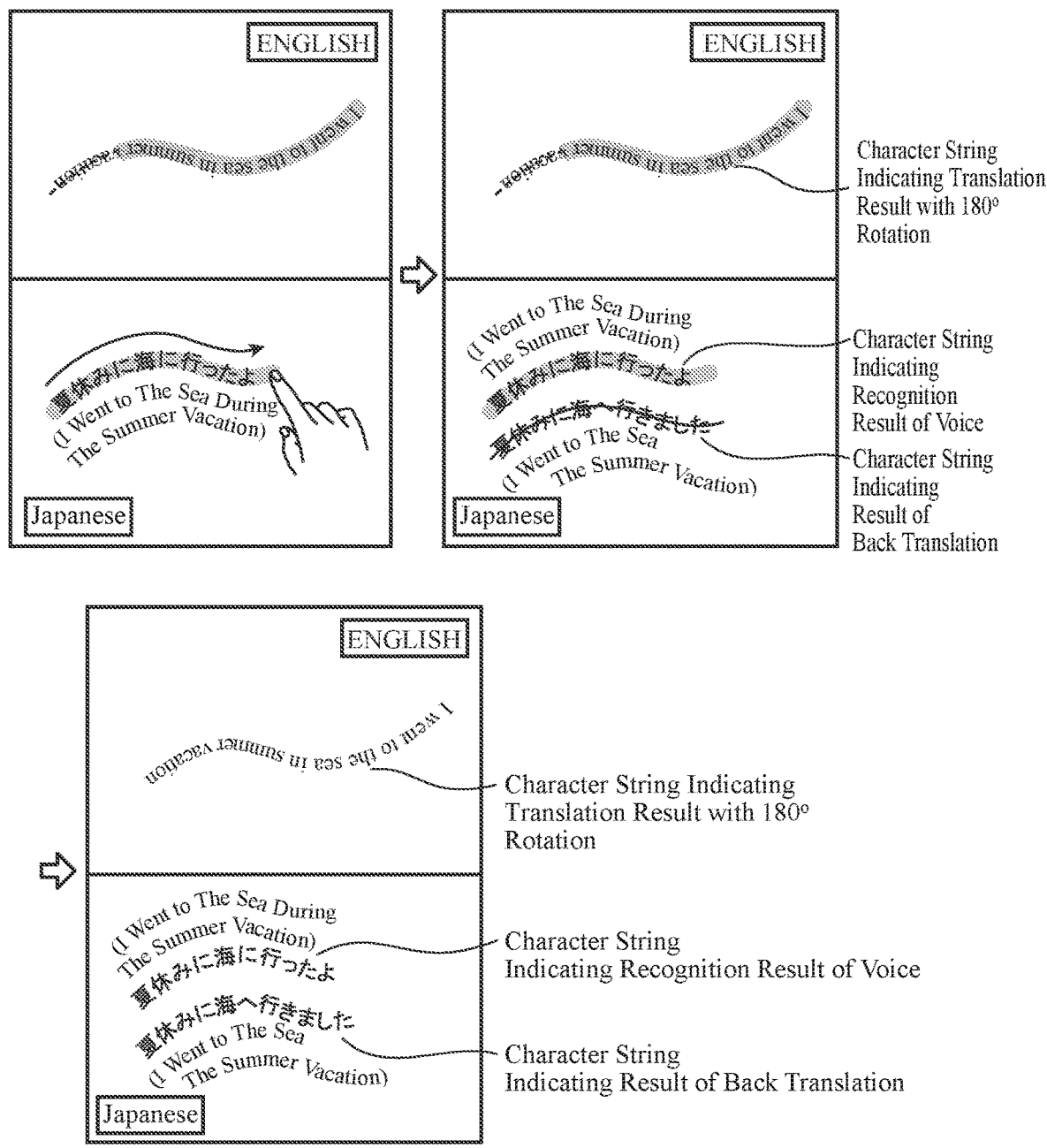
FIG. 21 is an explanatory diagram illustrating an example of displaying a character string indicating a translation result.

Further, even in the case of the back-to-back two screens, a character string indicating a result of back translation may be displayed, as illustrated in FIG. 21.

Third Embodiment

In the first embodiment, the character string recognizing unit 5 has acquired the character string indicating the recognition result of a voice as the character string to be displayed. However, as the character string to be displayed, a character string indicating a recognition result of characters drawn by an operation received by an operation receiving unit 1 may be acquired.

Figure 22:
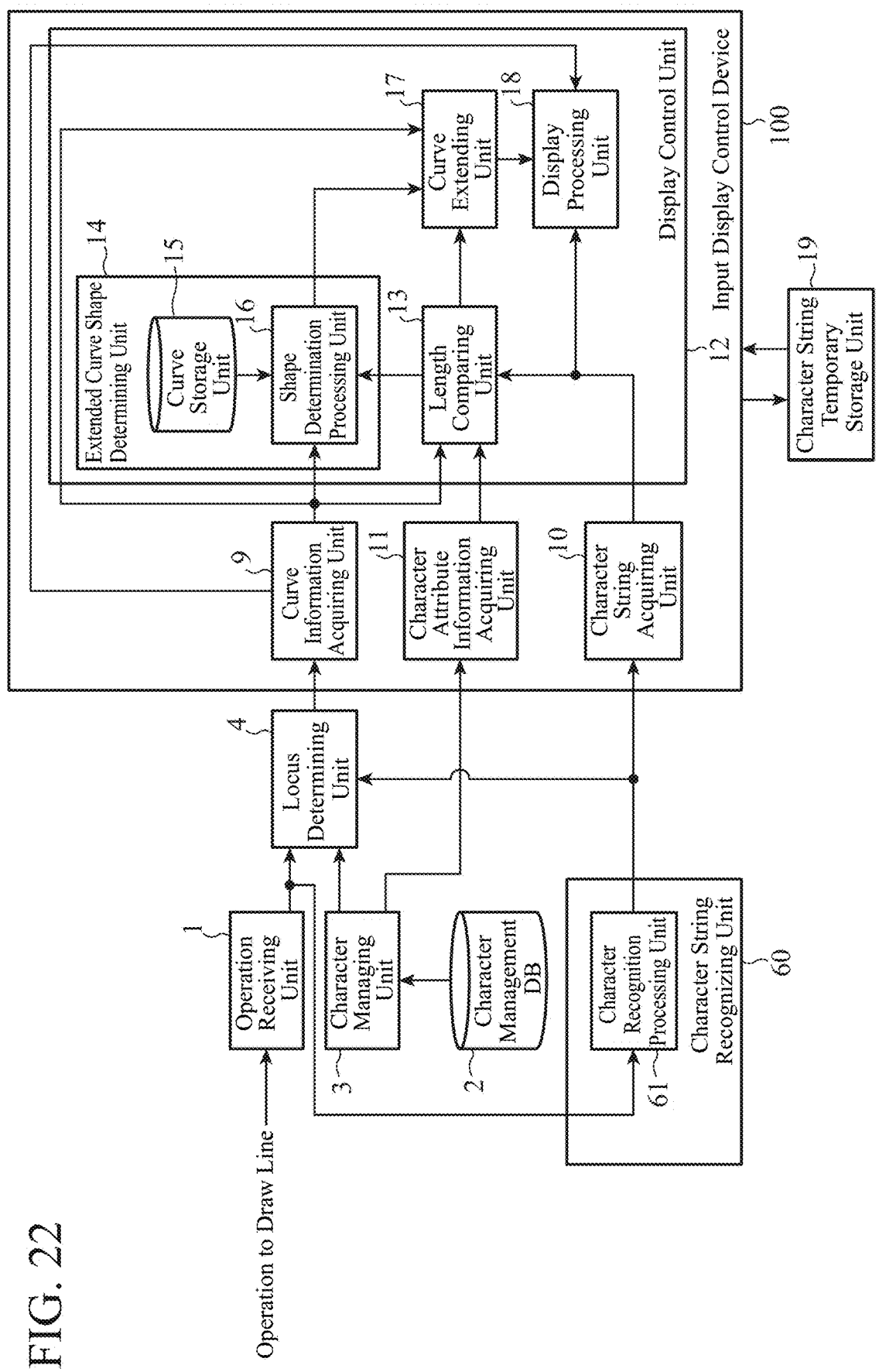
FIG. 22 is a configuration diagram illustrating an input display system including an input display control device according to a third embodiment of the present invention.
Figure 23:
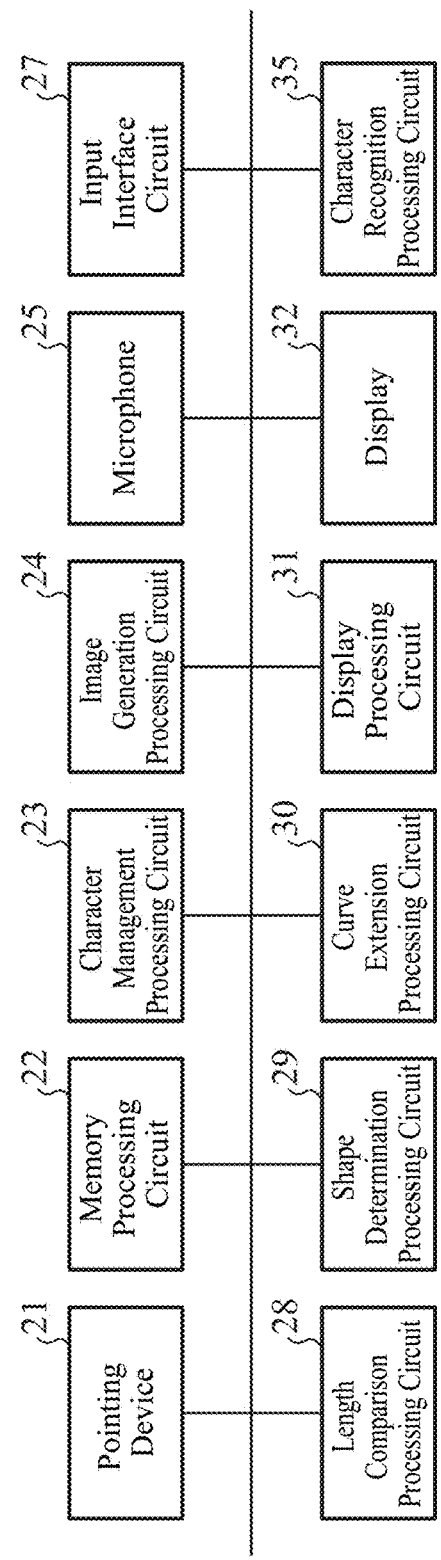
FIG. 23 is a hardware configuration diagram of the input display system according to the third embodiment of the present invention.

FIG. 22 is a configuration diagram illustrating an input display system including an input display control device according to a third embodiment of the present invention, and FIG. 23 is a hardware configuration diagram of the input display system according to the third embodiment of the present invention.

In FIGS. 22 and 23, the same reference numeral as that in FIGS. 1 and 2 represents the same or corresponding part, and thus description thereof is omitted.

A character string recognizing unit 60 includes a character recognition processing unit 61, and performs processing of outputting a character string indicating a recognition result of characters drawn by an operation received by the operation receiving unit 1 as a character string to be displayed.

The character recognition processing unit 61 is implemented by, for example, a character recognition processing circuit 35 having an optical character recognition (OCR) function, which is optical character recognition processing, and performs processing of recognizing characters drawn by the operation received by the operation receiving unit 1 and outputting a character string indicating a recognition result of the characters as the character string to be displayed.

In FIG. 22, each of the operation receiving unit 1, a character management DB 2, a character managing unit 3, a locus determining unit 4, the character string recognizing unit 60, a curve information acquiring unit 9, a character string acquiring unit 10, a character attribute information acquiring unit 11, a length comparing unit 13, an extended curve shape determining unit 14, a curve extending unit 17, a display processing unit 18, and a character string temporary storage unit 19, which are constituent elements of the input display system, is supposed to be implemented by dedicated hardware illustrated in FIG. 23, that is, a pointing device 21, a memory processing circuit 22, a character management processing circuit 23, an image generation processing circuit 24, a microphone 25, a voice recognition processing circuit 26, an input interface circuit 27, a length comparison processing circuit 28, a shape determination processing circuit 29, a curve extension processing circuit 30, a display processing circuit 31, a display 32, and a character recognition processing circuit 35. However, the input display system may be implemented by software, firmware, or a combination of software and firmware.

In a case where the input display system is implemented by software, firmware, or the like, the character management DB 2 and the character string temporary storage unit 19 are configured on a memory 41 of the computer illustrated in FIG. 3, and programs for causing the computer to execute processing procedures of the operation receiving unit 1, the character managing unit 3, the locus determining unit 4, the character recognition processing unit 61, and the display control unit 12 are stored in the memory 41, and a processor 42 illustrated in FIG. 3 may execute the programs stored in the memory 41.

Figure 24:
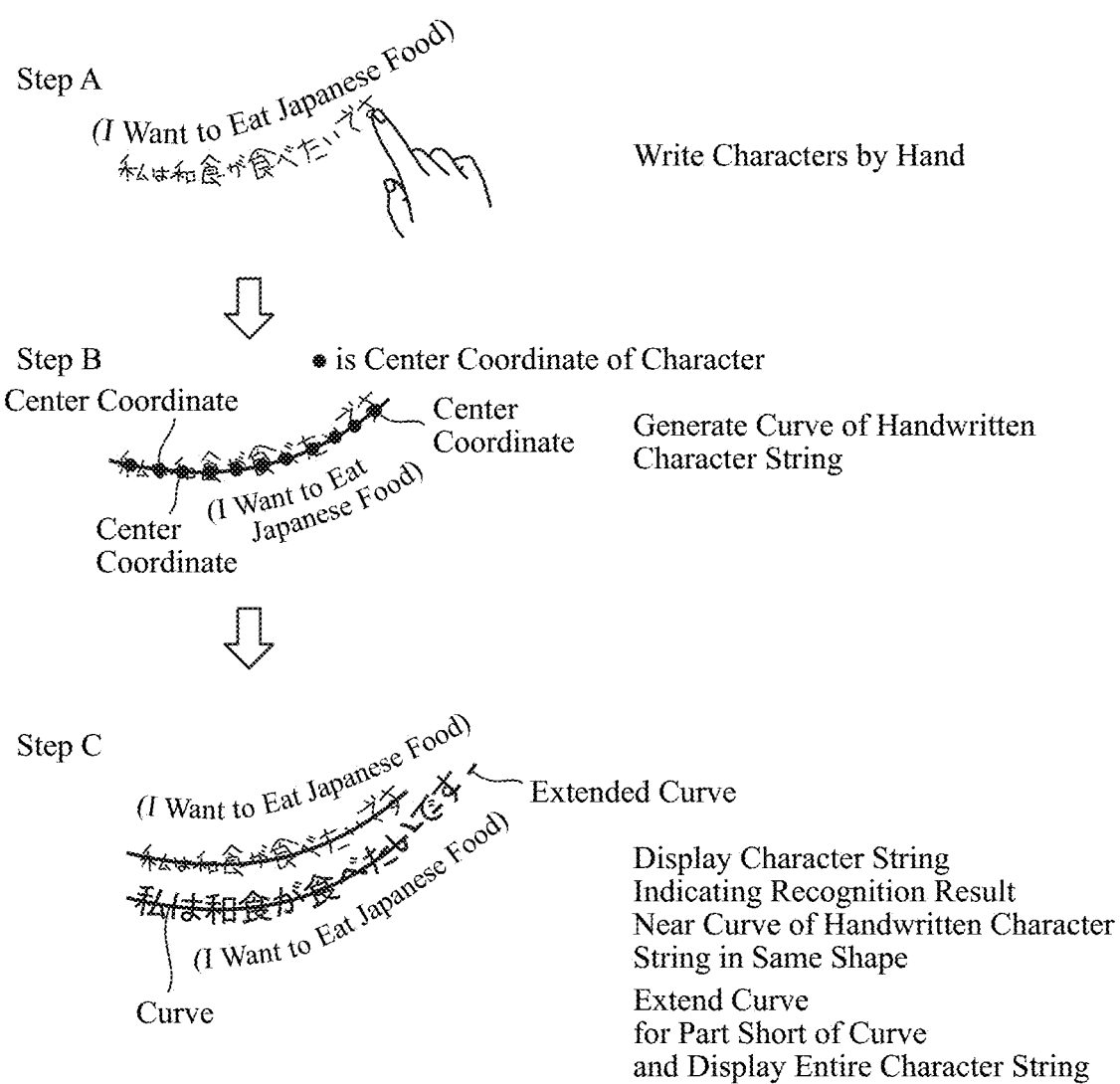
FIG. 24 is an explanatory diagram illustrating an example of display processing of a character string indicating a recognition result of characters.

FIG. 24 is an explanatory diagram illustrating an example of display processing of a character string indicating a recognition result of characters.

Next, an operation will be described.

In the third embodiment, the pointing device 21 that implements the operation receiving unit 1 is supposed to be a touch panel. Therefore, when a user performs an operation, on the touch panel, to draw characters using his/her own finger or an input pen for touch panel as an operation to draw a line, the operation receiving unit 1 outputs content of the operation to the locus determining unit 4 and the character string recognizing unit 60 in response to the operation to draw characters.

The content of the operation to draw characters to be output is, for example, time-series data indicating continuous change of coordinates of the position of the finger or the input pen touching the touch panel, that is, the position coordinates on the touch panel.

In the example of FIG. 24, in step A, a user is handwriting a character string "私は和食が食べた いです (I Want to eat Japanese food)".

The character recognition processing unit 61 of the character string recognizing unit 60 recognizes a plurality of characters drawn by the operation received by the operation receiving unit 1, acquires a character string indicating a recognition result of the plurality of characters, and outputs the character string to the locus determining unit 4 and the input display control device 100.

The locus determining unit 4 performs processing of allocating content of the operation to draw one or more characters into every character when receiving the character string from the character recognition processing unit 61 upon receiving content of the operation to draw one or more characters from the operation receiving unit 1.

Specific operation is as follows.

First, the locus determining unit 4 specifies a coordinate $X_{LEFT}$ with the smallest X coordinate, and a coordinate $X_{RIGHT}$ with the largest X coordinate from among position coordinates on a touch panel indicated by time-series data that is content of the operation to draw characters, and subtracts the coordinate $X_{LEFT}$ from the coordinate $X_{RIGHT}$, thereby to calculate the length of the character string in an X direction.

Then, the locus determining unit 4 calculates the length in the X direction per character by dividing the length of the character string in the X direction by the number of characters, and calculates a coordinate range in the X direction where each character exists from the length in the X direction per character and the coordinate $X_{LEFT}$. For example, the coordinate range in the X direction where an nth character from the left end of the character string exists is calculated in such a manner that (the length in the X direction per character×(n−1)+$X_{LEFT}$) to (the length in the X direction per character×n+$X_{LEFT}$).

Then, the locus determining unit 4 allocates the content of the operation to draw one or more characters into every character by finding a coordinate range in the X direction including the position coordinates indicated by the time-series data, and allocating each of the position coordinates indicated by the time-series data into a corresponding coordinate range in the X direction.

Next, the locus determining unit 4 calculates, in units of a coordinate range in the X direction, an average value of X coordinates and an average value of Y coordinates of the position coordinates indicated by the time-series data included in the coordinate range, as center coordinates of a character corresponding to the coordinate range.

When calculating the center coordinates of the characters constituting the character string, the locus determining unit 4 generates a line by connecting the center coordinates of the characters, as illustrated in step B in FIG. 24, and outputs, to the input display control device 100, curve information indicating a curve that is the one line representing a locus of the character string.

Here, the length in the X direction per character is calculated by dividing the length in the X direction of the character string by the number of characters, assuming that the size of each character constituting the character string is equal. In the case of handwritten characters, the size of each character is not always equal, and thus the unit of the coordinate range in the X direction may not match each character constituting the character string.

However, in the third embodiment, even if the center coordinates of the characters are not strictly known, the curve indicating the arranging direction of the character string can be obtained as long as center coordinates of regions obtained by dividing, in the X direction, a region where the character string exist, are known. Therefore, even if the size of each character is not equal, the curve can be obtained by the above method.

Further, here, the locus determining unit 4 has allocated the position coordinates indicated by the time-series data in units of the coordinate range in the X direction when obtaining the curve indicating the arranging direction of the character string. However, for example, in the case where handwritten characters are vertically written, the position coordinates indicated by the time-series data may be allocated in units of a coordinate range in a Y direction.

The method of allocating the position coordinates described here is merely an example, and it is needless to say that another method can be used.

In the third embodiment, the curve has been obtained from the operation content to draw characters. However, in a case where the user performs the operation to draw a line illustrated in the first embodiment separately from the operation to draw characters, and the operation to draw characters and the operation to draw a line are received by the operation receiving unit 1, the locus determining unit 4 may determine the curve representing the locus of the drawn line from the content of the operation to draw a line received by the operation receiving unit 1, similarly to the first embodiment.

When the character string acquiring unit 10 acquires the character string output from the character recognition processing unit 61 of the character string recognizing unit 60, the display processing unit 18 of the display control unit 12 generates display information for displaying the character string on the display 32 along the curve indicated by the curve information acquired by the curve information acquiring unit 9, and displaying the character string on the display 32 in accordance with the display information.

In step C of FIG. 24, a curve representing a locus is drawn to be arranged beside handwritten characters and a character string is displayed. However, the embodiment is not limited thereto, and for example, after the handwritten characters are deleted, the curve may be drawn on the position of the handwritten characters, and the character string may be displayed.

Further, the curve representing the locus may be transparent.

In the third embodiment, the curve can be obtained from the operation content to draw characters. However, the recognized character string is displayed with predetermined attribute characters, similarly to the first embodiment. Therefore, in the case where the length of the obtained curve is shorter than the length of the character string, the display processing unit 18 cannot display a part of the characters constituting the character string along the curve, similarly to the first embodiment.

In this case, as in the first embodiment, the un-displayed part of characters is displayed by extending the curve.

That is, the length comparing unit 13 compares the length of the curve and the length of the character string, the extended curve shape determining unit 14 determines the shape of an extended curve, the curve extending unit 17 adds the extended curve to the curve indicated by the curve information acquired by the curve information acquiring unit 9 to extend the curve. Then, the display processing unit 18 displays the un-displayed part of characters along the extended curve.

As is clear from the above description, according to the third embodiment, the character string recognizing unit 60 includes the character recognition processing unit 61 that recognizes the characters drawn by the operation received by the operation receiving unit 1 and acquires the character string indicating the recognition result of the characters as the character string to be displayed. Therefore, an effect similar to that of the first embodiment is exhibited even in the case of displaying handwritten characters.

Fourth Embodiment

In the third embodiment, the example of using the character string recognizing unit 60 including the character recognition processing unit 61 to the input display control device in FIG. 1 in the first embodiment has been described.

However, the character string recognizing unit 60 including the character recognition processing unit 61 may be used to the input display control device in FIG. 14 in the second embodiment.

Figure 25:
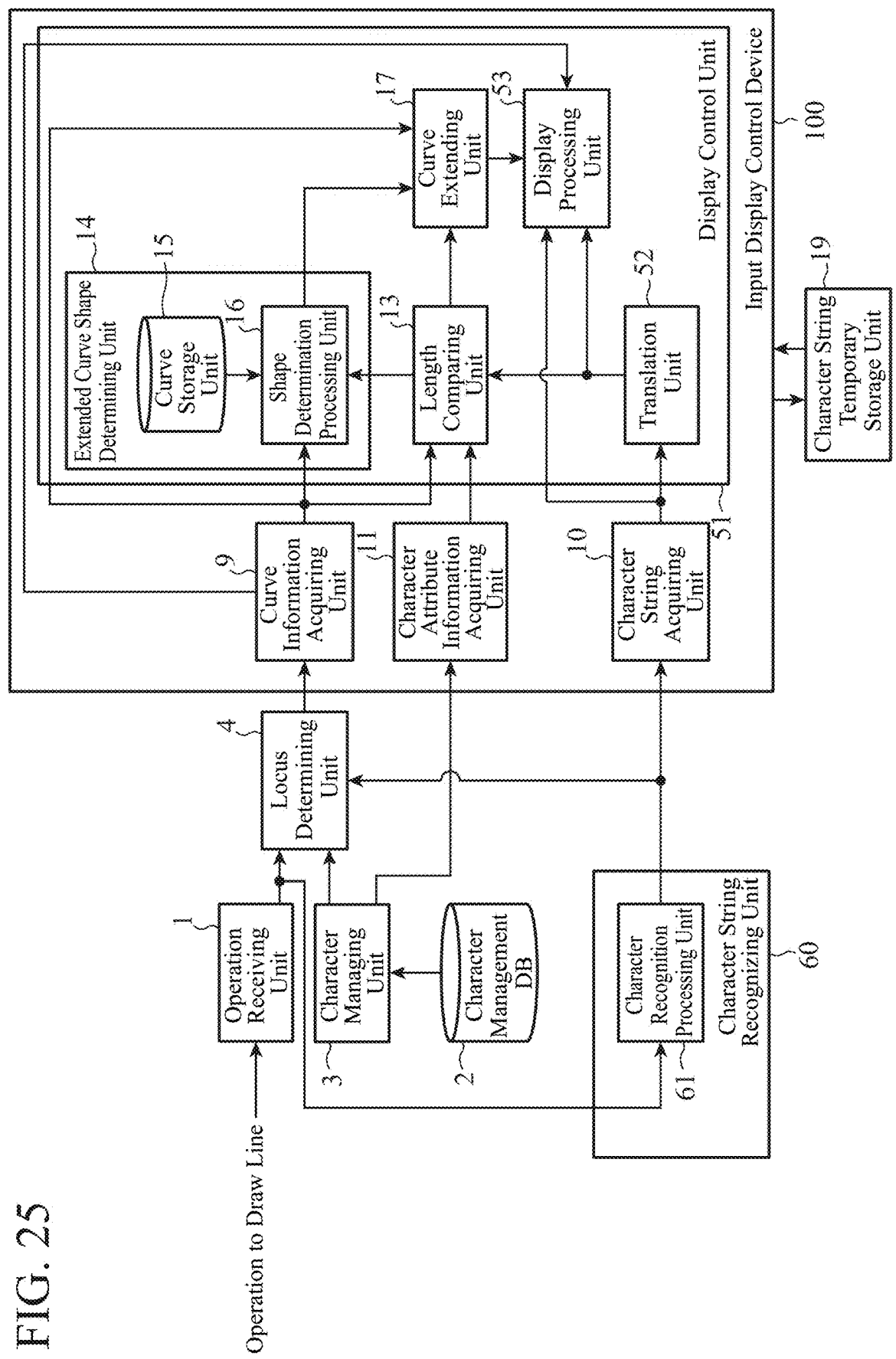
FIG. 25 is a configuration diagram illustrating an input display system including an input display control device according to a fourth embodiment of the present invention.

FIG. 25 is a configuration diagram illustrating an input display system including an input display control device according to a fourth embodiment of the present invention.

Figure 26:
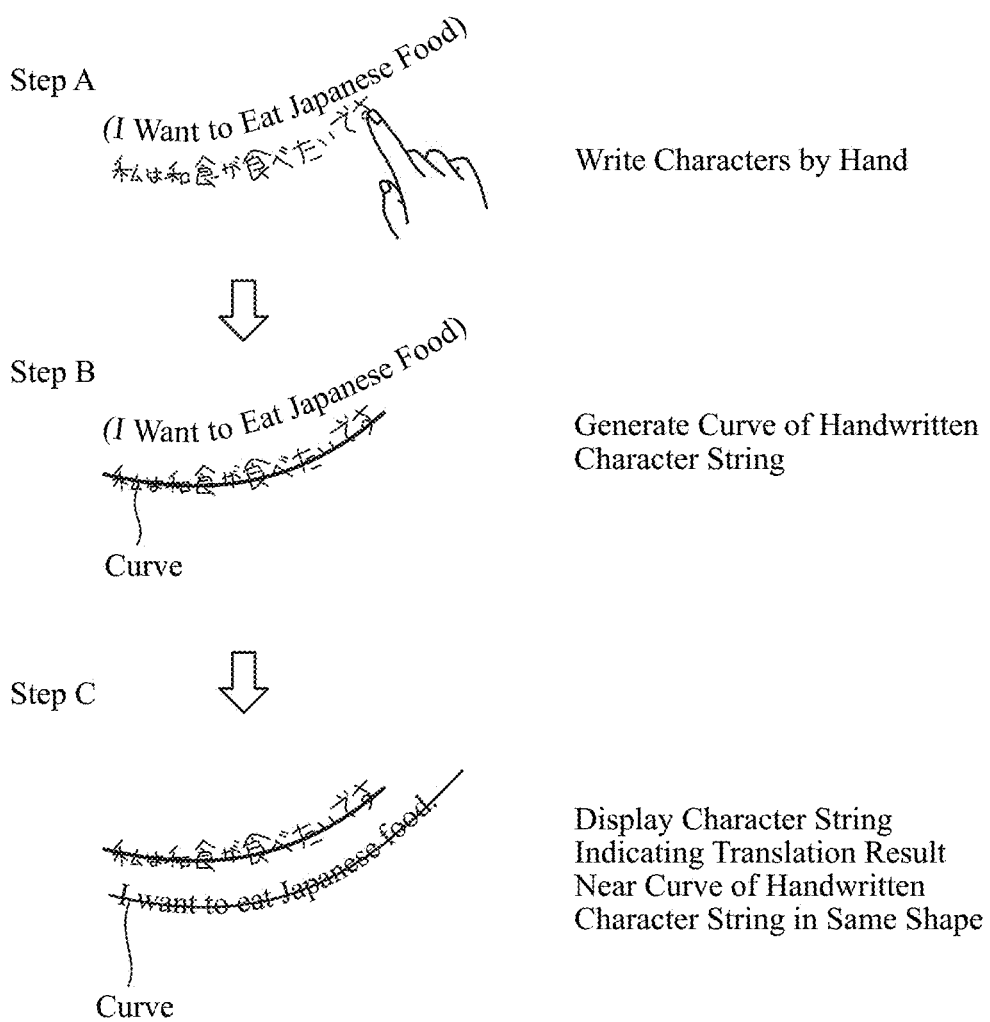
FIG. 26 is an explanatory diagram illustrating an example of display processing of a character string indicating a translation result.
Figure 20:
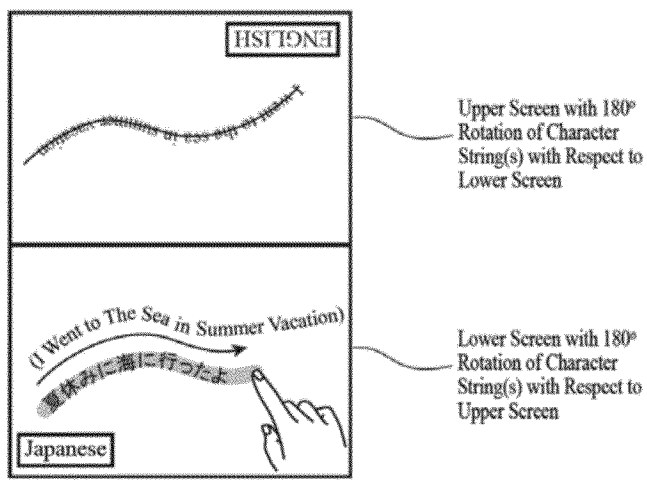
Figure 21:
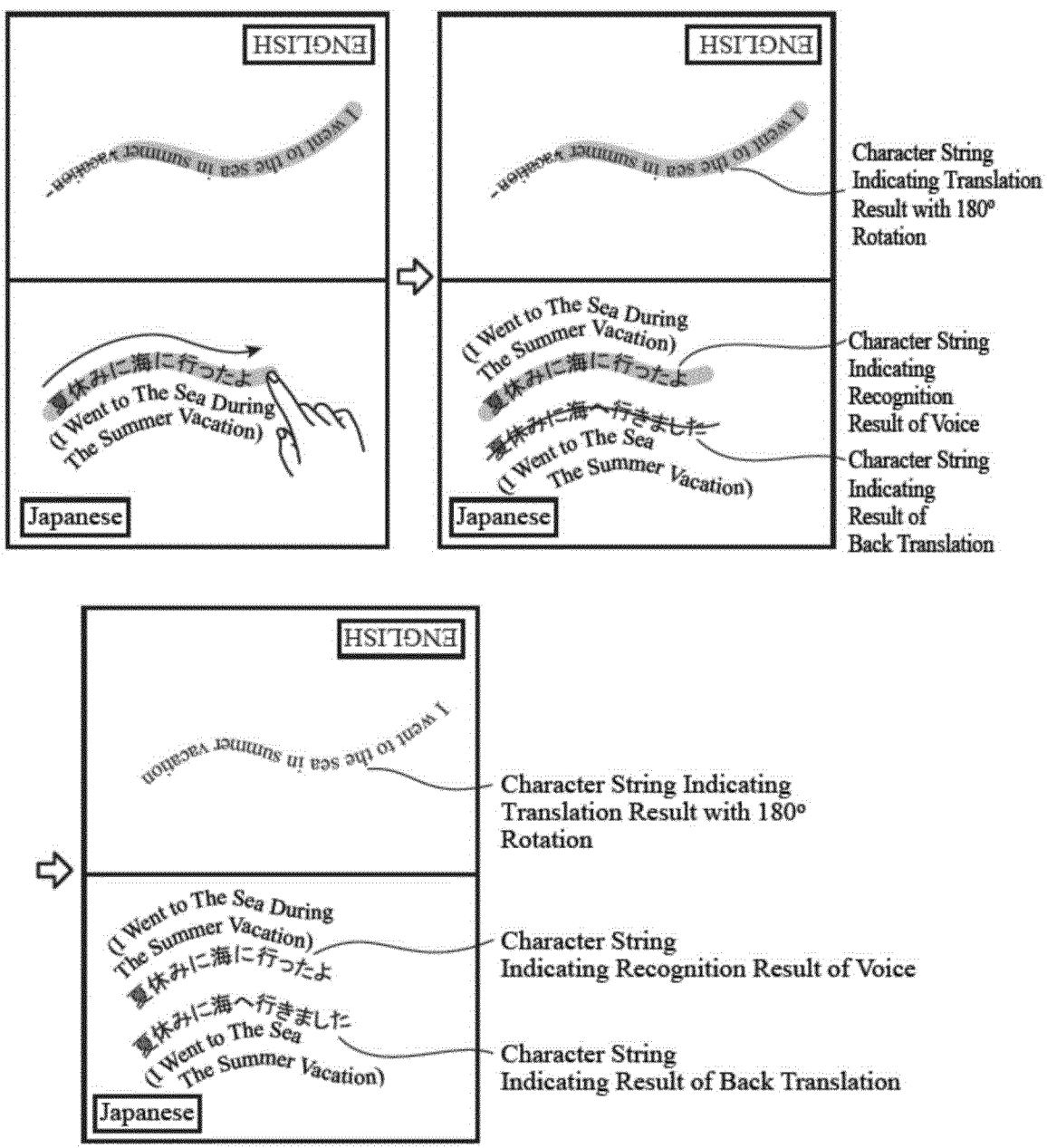

FIG. 26 is an explanatory diagram illustrating an example of display processing of a character string indicating a translation result.

In the third embodiment, the character string indicating the recognition result of the plurality of characters has been displayed on the display 32 along the curve indicated by the curve information acquired by the curve information acquiring unit 9. However, the fourth embodiment is different in that a display processing unit 53 of a display control unit 51 also displays a character string indicating a translation result output from a translation unit 52 on a display 32 along a curve indicated by curve information acquired by a curve information acquiring unit 9, as illustrated in step C in FIG. 26.

According to the fourth embodiment, as in the second embodiment, an effect to display the entire character string along the curve is exhibited even when the length of the curve indicated by the curve information acquired by the curve information acquiring unit 9 is shorter than the length of the character string indicating the translation result of the translation unit 52.

Note that the invention of the present application allows free combinations of the embodiments, modifications of arbitrary constituent elements of the embodiments, or omissions of arbitrary constituent elements in the embodiments, within the scope of the invention.

INDUSTRIAL APPLICABILITY

The input display control device, the input display control method, and the input display system according to the present invention are suitable for use in displaying a character string.

REFERENCE SIGNS LIST

1: Operation receiving unit, 2: Character management DB, 3: Character managing unit, 4: Locus determining unit, 5: Character string recognizing unit, 6: Voice detecting unit, 7: Voice recognition dictionary DB, 8: Voice recognizing unit, 9: Curve information acquiring unit, 10: Character string acquiring unit, 11: Character attribute information acquiring unit, 12: Display control unit, 13: Length comparing unit, 14: Extended curve shape determining unit, 15: Curve storage unit, 16: Shape determination processing unit, 17: Curve extending unit, 18: Display processing unit, 19: Character string temporary storage unit, 21: Pointing device, 22: Memory processing circuit, 23: Character management processing circuit, 24: Image generation processing circuit, 25: Microphone, 26: Voice recognition processing circuit, 27: Input interface circuit, 28: Length comparison processing circuit, 29: Shape determination processing circuit, 30: Curve extension processing circuit, 31: Display processing circuit, 32: Display, 34: Translation processing circuit, 35: Character recognition processing circuit, 41: Memory, 42: Processor, 51: Display control unit, 52: Translation unit, 53: Display processing unit, 60: Character string recognizing unit, 61: Character recognition processing unit, 100: Input display control device

The invention claimed is:

1. An input display control device comprising:
a processor; and
a memory storing instructions which, when executed by the processor, causes the processor to perform processes of:
acquiring curve information indicating a curve;
acquiring a character string; and
generating display information for displaying the acquired character string along the curve indicated by the acquired curve information,
wherein the processor determines, when determining that a part of the acquired character string is not able to be displayed along the curve indicated by the acquired curve information because a length of the curve is short, a shape of an extended part of the curve from a shape of the curve, extends the curve, and generates display information for displaying the part of the character string along the curve of the extended part,
the processes include:
comparing the length of the curve indicated by the acquired curve information and a length of the acquired character string,
determining a shape of an extended curve that is the curve of the extended part from the shape of the curve when a comparison result of the length comparing unit indicates that the length of the curve is shorter than the length of the character string,
adding the extended curve with the determined shape to an end of the curve indicated by the acquired curve information, and
generating display information for displaying the part of the character string along the added, extended curve.

2. The input display control device according to claim 1, wherein the processes include
storing a plurality of curves having different shapes, and
collating the stored shapes of the plurality of curves and the shape of the curve indicated by the acquired curve information, selecting a shape of a curve corresponding to the shape of the curve indicated by the acquired curve information from among the stored shapes of the plurality of curves, and determining the shape of the extended curve from the selected shape of a curve.

3. The input display control device according to claim 1, wherein the processes include
translating the acquired character string, wherein
the processor further generates a curve for displaying a translated character string having a length equal to or longer than a length of a character string indicating a translation result, and generates display information for displaying the character string indicating a translation result along the curve for displaying the translated character string.

4. An input display control method comprising:
acquiring, by a curve information acquirer, curve information indicating a curve;
acquiring, by a character string acquirer, a character string; and
performing, by a display controller, processing of generating display information for displaying the character string acquired by the character string acquirer along the curve indicated by the curve information acquired by the curve information acquirer,
in the display controller, when determining that a part of the character string acquired by the character string acquirer is not able to be displayed along the curve indicated by the curve information acquired by the curve information acquirer because a length of the curve is short, determining a shape of an extended part of the curve from a shape of the curve, extending the curve, and generating display information for displaying the part of the character string along the curve of the extended part, comparing the length of the curve indicated by the acquired curve information and a length of the acquired character string, determining a shape of an extended curve that is the curve of the extended part from the shape of the curve when a comparison result indicates that the length of the curve is shorter than the length of the character string, adding the extended curve with the determined shape to an end of the curve indicated by the acquired curve information, and generating display information for displaying the part of the character string along the added extended curve.

5. An input display system comprising:

an operation receiver to receive an operation to draw a line;

a processor; and a memory storing instructions which, when executed by the processor, causes the processor to perform processes of:

determining a locus of the line drawn by the received operation;

recognizing a character string to be displayed;

acquiring curve information indicating a curve representing the determined locus;

acquiring the recognized character string; and generating display information for displaying the acquired character string along the curve indicated by the acquired curve information, wherein the processor determines, when determining that a part of the acquired character string is not able to be displayed along the curve indicated by the acquired curve information because a length of the curve is short, a shape of an extended part of the curve from a shape of the curve, extends the curve, and generates display information for displaying the part of the character string along the curve of the extended part, the processes include:

comparing the length of the curve indicated by the acquired curve information and a length of the acquired character string, determining a shape of an extended curve that is the curve of the extended part from the shape of the curve when a comparison result of the length comparing unit indicates that the length of the curve is shorter than the length of the character string, adding the extended curve with the determined shape to an end of the curve indicated by the acquired curve information, and generating display information for displaying the part of the character string along the added, extended curve.

6. The input display system according to claim 5, wherein the processes include detecting a voice, and recognizing the detected voice, and acquiring a character string indicating a recognition result of the voice as a character string to be displayed.

7. The input display system according to claim 5, wherein the processes include recognizing a character drawn by a received operation and acquiring a character string indicating a recognition result of the character as a character string to be displayed.

8. A non-transitory computer readable medium having stored therein a program for causing a computer to execute operations comprising:

acquiring curve information indicating a curve;

acquiring a character string, and performing processing of generating display information for displaying the character string along the curve indicated by the curve information, when a part of the character string is determined to not be able to be displayed along the curve indicated by the curve information because a length of the curve is short, determining a shape of an extended part of the curve from a shape of the curve, extending the curve, and generating display information for displaying the part of the character string along the curve of the extended part, comparing the length of the curve indicated by the acquired curve information and a length of the acquired character string, determining a shape of an extended curve that is the curve of the extended part from the shape of the curve when a comparison result indicates that the length of the curve is shorter than the length of the character string, adding the extended curve with the determined shape to an end of the curve indicated by the acquired curve information, and generating display information for displaying the part of the character string along the added extended curve.

* * * * *

UNITED STATES PATENT AND TRADEMARK OFFICE
CERTIFICATE OF CORRECTION

PATENT NO. : 10,884,612 B2
APPLICATION NO. : 16/068459
DATED : January 5, 2021
INVENTOR(S) : Masato Hirai et al.

It is certified that error appears in the above-identified patent and that said Letters Patent is hereby corrected as shown below:

In the Drawings

Sheet 20, Fig. 20, the label ENGLISH should be rotated 180 degrees as shown on the attached sheet.

Sheet 21, Fig. 21, the labels ENGLISH should be rotated 180 degrees as shown on the attached sheet.

Signed and Sealed this
Twenty-fifth Day of May, 2021

Drew Hirshfeld
*Performing the Functions and Duties of the
Under Secretary of Commerce for Intellectual Property and
Director of the United States Patent and Trademark Office*